(12) United States Patent
Nakashima et al.

(10) Patent No.: US 10,677,314 B2
(45) Date of Patent: Jun. 9, 2020

(54) POWER TRANSMISSION APPARATUS WITH CENTRIFUGAL PENDULUM DAMPER

(71) Applicant: MAZDA MOTOR CORPORATION, Aki-gun, Hiroshima (JP)

(72) Inventors: Kyosei Nakashima, Hiroshima (JP); Kazuhiro Tanaka, Hiroshima (JP); Norio Iwashita, Hiroshima (JP); Shinya Kamada, Kure (JP); Hiroo Akagi, Hiroshima (JP); Tomokazu Kinoshita, Hiroshima (JP); Hiroyuki Okayama, Hiroshima (JP); Narihito Hongawara, Hiroshima (JP); Keiji Bouda, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 271 days.

(21) Appl. No.: 15/756,519

(22) PCT Filed: Sep. 26, 2016

(86) PCT No.: PCT/JP2016/078226
§ 371 (c)(1),
(2) Date: Feb. 28, 2018

(87) PCT Pub. No.: WO2017/057249
PCT Pub. Date: Apr. 6, 2017

(65) Prior Publication Data
US 2018/0283492 A1    Oct. 4, 2018

(30) Foreign Application Priority Data

Sep. 30, 2015  (JP) .................................. 2015-193149

(51) Int. Cl.
*F16F 15/14* (2006.01)
*F16F 15/123* (2006.01)
(Continued)

(52) U.S. Cl.
CPC .... *F16F 15/1478* (2013.01); *F16F 15/12366* (2013.01); *F16H 45/02* (2013.01);
(Continued)

(58) Field of Classification Search
None
See application file for complete search history.

(56) References Cited

U.S. PATENT DOCUMENTS

| 9,316,299 B2 * | 4/2016 | Doegel | ................... F16H 45/02 |
| 2002/0033310 A1 * | 3/2002 | Sasse | ...................... F16H 45/02 |
| | | | 192/3.29 |

(Continued)

FOREIGN PATENT DOCUMENTS

| DE | 102012217171 | * | 3/2014 | ............ F16H 47/08 |
| JP | H10184799 A | | 7/1998 | |

(Continued)

OTHER PUBLICATIONS

ISA Japan Patent Office, International Search Report Issued in PCT Application No. PCT/JP2016/078226, Dec. 20, 2016, WIPO, 2 pages.

*Primary Examiner* — Charles A Fox
*Assistant Examiner* — Ryan P Dodd
(74) *Attorney, Agent, or Firm* — Alleman Hall Creasman & Tuttle LLP

(57) ABSTRACT

A power transmission apparatus with a centrifugal pendulum damper is realized, which can effectively suppress torque fluctuation and vibration noise of a vehicle while avoiding size increase of a centrifugal pendulum damper and deterioration of reliability of the centrifugal pendulum damper by high-speed rotation. A power transmission apparatus with a centrifugal pendulum damper includes: a centrifugal pendulum damper coupled to an input shaft through a speed-increasing mechanism configured to increase speed of rotation of the input shaft; and an engagement/disengagement mechanism capable of realizing and cutting off power transmission from the input shaft to the centrifugal pendulum damper.

2 Claims, 13 Drawing Sheets

(51) Int. Cl.
*F16H 45/02* (2006.01)
*F16H 1/28* (2006.01)
*F16F 15/131* (2006.01)

(52) U.S. Cl.
CPC .......... *F16F 15/13157* (2013.01); *F16H 1/28* (2013.01); *F16H 2045/0226* (2013.01); *F16H 2045/0263* (2013.01); *F16H 2045/0268* (2013.01)

(56) References Cited

U.S. PATENT DOCUMENTS

2013/0029804 A1* 1/2013 Misala .................. F16D 27/004
  477/5
2016/0160957 A1* 6/2016 Dieckhoff ........... F16F 15/1206
  192/3.28

FOREIGN PATENT DOCUMENTS

| JP | 20101905 A | 1/2010 |
| JP | 2013092183 A | 5/2013 |
| JP | 2014228009 A | 12/2014 |
| WO | 2013108407 A1 | 7/2013 |

* cited by examiner

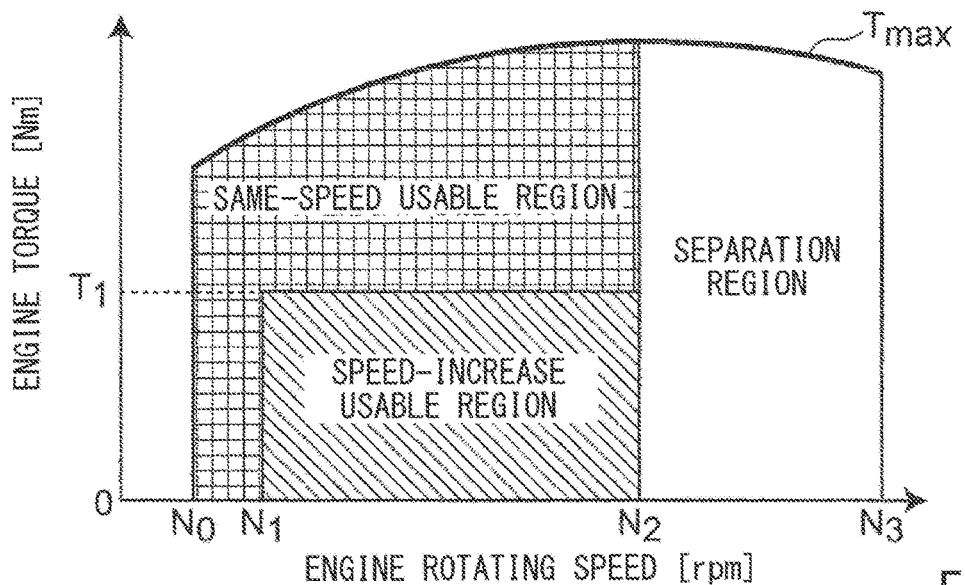
Fig. 7A
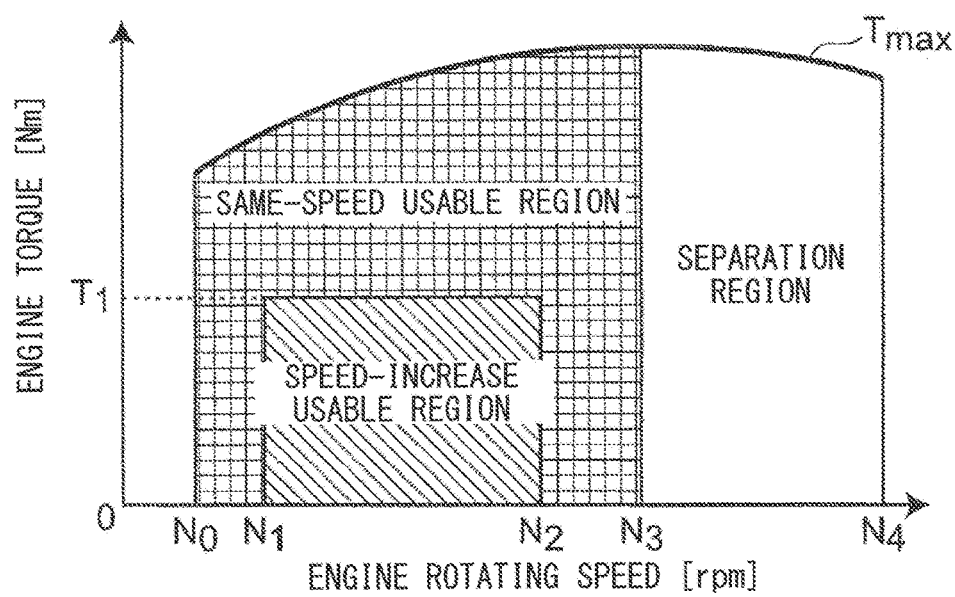
Fig. 7B
| OPERATION REGIONS | FIRST CLUTCH (14A) | SECOND CLUTCH (14B) |
|---|---|---|
| SPEED INCREASE | ON | OFF |
| SAME SPEED | OFF | ON |
| SEPARATION | OFF | OFF |
Fig. 8

POWER TRANSMISSION APPARATUS WITH CENTRIFUGAL PENDULUM DAMPER

TECHNICAL FIELD

The present invention relates to a power transmission apparatus of a vehicle or the like, and particularly to a power transmission apparatus including a centrifugal pendulum damper.

BACKGROUND ART

To improve fuel efficiency of engines that drive vehicles and the like, multiple cylinder engines are practically used, each of which is controlled to perform a reduced cylinder operation in which: an all cylinder operation is performed during a high load; and a part of cylinders is stopped during a low load.

In general, as the number of cylinders decreases, torque fluctuation increases due to intermittent explosions. Further, when ignition intervals of a plurality of cylinders become non-uniform, the torque fluctuation increases. Therefore, the torque fluctuation during the reduced cylinder operation tends to be larger than that during the all cylinder operation. The lower the rotation of the engine is, the more significant this tendency becomes.

To further improve the fuel efficiency, engines adopting homogeneous-charge compression ignition (hereinafter referred to as "HCCI") combustion are practically used. However, performing the HCCI combustion in all operation regions is difficult at present. Therefore, switching combustion modes in accordance with the operation regions is being considered. One example of this is that a HCCI combustion mode is used in a low-rotation low-load range, and a spark ignition (hereinafter referred to as "SI") combustion mode is used in a high-rotation range or a high-load range.

However, in general, the torque fluctuation by the HCCI combustion that is bulk combustion by self ignition at multipoints tends to be larger than the torque fluctuation by the SI combustion that is flame propagation combustion by spark ignition. Therefore, according to such engines, large torque fluctuation may occur in a low-rotation range where the HCCI combustion mode is used.

Further, known in recent years are vehicles in which transmission efficiency of an engine is improved by omitting a torque converter of an automatic transmission for the purpose of improving the fuel efficiency of the engine. Regarding the omission of the torque converter of the automatic transmission, for example, adopting a torsional damper instead of the torque converter is being considered. In this case, by providing the torsional damper on a power transmission path, the torque fluctuation is absorbed to some extent. However, the torsional damper typically absorbs only the torque fluctuation of preset major frequency components. Therefore, when the torque fluctuation has a plurality of frequency components, or the frequency components fluctuate, it is difficult to absorb the torque fluctuation of frequency components other than the preset frequency components, unlike the torque converter configured to transmit torque through a fluid.

According to the vehicles which adopt the reduced cylinder operation of the engine, the HCCI combustion, or the technology of the omission of the torque converter of the automatic transmission, there is a problem that torsional vibrations generated by the torque fluctuation especially in the low-rotation range are amplified by resonance of a power transmission system, and this causes vibrations and noises at respective portions of the vehicle.

To solve this problem, it is known that a centrifugal pendulum damper is provided at a power transmitting shaft. The centrifugal pendulum damper includes: a supporting member configured to rotate together with the power transmitting shaft; and a pendulum that is a mass body supported by the supporting member so as to be swingable around a point on a circumference having a predetermined radius from a center axis of the supporting member. If the pendulum swings by the torque fluctuation, component force in a circumferential direction is generated at the supporting member that receives centrifugal force acting on the pendulum. This component force serves as anti-torque that suppresses the torque fluctuation of the supporting member and the power transmitting shaft. This centrifugal force is proportional to the weight and turning radius of the mass body. Therefore, damping performance of the centrifugal pendulum damper can be improved by increasing the weight or turning radius of the mass body. However, in this case, there is a problem that the centrifugal pendulum damper itself increases in size, and this is disadvantageous in terms of its weight and arrangement space.

Further, this centrifugal force is proportional to the square of the rotating speed of the mass body. Therefore, as disclosed in PTL 1 for example, it is though that: the centrifugal pendulum damper is connected to the power transmitting shaft through a speed-increasing mechanism including a planetary gear set or the like; and with this, by increasing the rotating speed of the mass body, the damping performance of the centrifugal pendulum damper is improved while avoiding the size increase of the damper.

PTL 2 discloses an apparatus including an engagement/disengagement mechanism configured to connect and disconnect the power transmitting shaft and the centrifugal pendulum damper. To prevent noise from being generated, the engagement/disengagement mechanism cuts off the power transmission to the centrifugal pendulum damper in the low-rotation range of the engine. The noise is generated since: when the engine is operated in the low-rotation range at the time of start-up or the like, and the rotating speed of the power transmitting shaft provided with the centrifugal pendulum damper is therefore low, the centrifugal force acting on the pendulum is low; and therefore, when the torque fluctuation larger than anti-torque generated by the centrifugal force is generated, the pendulum swings to contact a peripheral member. The apparatus of PTL 2 prevents such noise from being generated.

CITATION LIST

Patent Literature

PTL 1: Japanese Laid-Open Patent Application Publication No. 10-184799

PTL 2: Japanese Laid-Open Patent Application Publication No. 2014-228009

SUMMARY OF INVENTION

Technical Problem

However, according to the conventional art of PTL 1, when the engine is operated in the high-rotation range, the rotating speed of the power transmitting shaft provided with the centrifugal pendulum damper increases, and the rotating speed of the mass body is increased by the speed-increasing mechanism with respect to the power transmitting shaft. Therefore, to secure reliability of the centrifugal pendulum damper, the centrifugal pendulum damper needs to have a structure that can endure the centrifugal force at the time of high-speed rotation, and this may cause the size increase. Further, according to the conventional art of PTL 2, at the time of the high rotation of the centrifugal pendulum damper which does not cause the contact between the pendulum and the power transmitting shaft, to suppress the torque fluctuation of the engine, the engagement/disengagement mechanism is engaged to connect the centrifugal pendulum damper and the power transmitting shaft. Therefore, the conventional art of PTL 2 does not provide a solution to the deterioration of the reliability of the centrifugal pendulum damper at the time of the high rotation of the centrifugal pendulum damper.

The present invention was made under the above circumstances regarding the power transmission apparatus with the centrifugal pendulum damper, and an object of the present invention is to effectively suppress torque fluctuation and vibration noise of a vehicle while avoiding a size increase of the centrifugal pendulum damper and a deterioration of reliability of the centrifugal pendulum damper at the time of high-speed rotation.

Solution to Problem

To solve the above problems, a power transmission apparatus with a centrifugal pendulum damper according to each aspect of the present invention is configured as follows.

A first aspect of the present invention is a power transmission apparatus with a centrifugal pendulum damper, the power transmission apparatus including: a speed-increasing mechanism configured to increase speed of rotation of a power transmitting shaft; a centrifugal pendulum damper coupled to the power transmitting shaft through the speed-increasing mechanism; and an engagement/disengagement mechanism configured to realize and cut off power transmission from the power transmitting shaft to the centrifugal pendulum damper.

A second aspect of the present invention is configured such that in the power transmission apparatus according to the first aspect of the present invention, the engagement/disengagement mechanism is provided so as to realize and cut off the power transmission from the power transmitting shaft to the speed-increasing mechanism.

A third aspect of the present invention is configured such that: in the power transmission apparatus according to the first or second aspect of the present invention, the engagement/disengagement mechanism includes a first engagement/disengagement mechanism and a second engagement/disengagement mechanism; the first engagement/disengagement mechanism and the speed-increasing mechanism are interposed on a first power transmission path extending between the power transmitting shaft and the centrifugal pendulum damper; and the second engagement/disengagement mechanism is interposed on a second power transmission path extending between the power transmitting shaft and the centrifugal pendulum damper and provided in parallel with the first power transmission path.

A fourth aspect of the present invention is configured such that: in the power transmission apparatus according to any one of the first to third aspects of the present invention, the speed-increasing mechanism is a single pinion type planetary gear set including a sun gear, a pinion carrier, and a ring gear; the pinion carrier is coupled to the power transmitting shaft; one of the sun gear and the ring gear is coupled to the centrifugal pendulum damper; and the other of the sun gear and the ring gear is coupled to a restraining unit configured to restrain rotation of the other of the sun gear and the ring gear.

A fifth aspect of the present invention is configured such that: in the power transmission apparatus according to any one of the first to third aspects of the present invention, the speed-increasing mechanism is a double pinion type planetary gear set including a sun gear, a pinion carrier, and a ring gear; the ring gear is coupled to the power transmitting shaft; one of the sun gear and the pinion carrier is coupled to the centrifugal pendulum damper; and the other of the sun gear and the pinion carrier is coupled to a restraining unit configured to restrain rotation of the other of the sun gear and the pinion carrier.

A sixth aspect of the present invention is configured such that: in the power transmission apparatus according to the first aspect of the present invention, the speed-increasing mechanism is a planetary gear set including a sun gear, a pinion carrier, and a ring gear; and the engagement/disengagement mechanism is a brake mechanism configured to brake rotation of any one of the sun gear, pinion carrier, and ring gear of the planetary gear set.

A seventh aspect of the present invention is configured such that in the power transmission apparatus according to any one of the first to sixth aspects of the present invention, the engagement/disengagement mechanism is configured to suppress excessive rotation of the centrifugal pendulum damper.

An eighth aspect of the present invention is a power transmission apparatus with a centrifugal pendulum damper, the power transmission apparatus including: a speed-increasing mechanism configured to increase speed of rotation of a power transmitting shaft; a centrifugal pendulum damper coupled to the power transmitting shaft through the speed-increasing mechanism; and an engagement/disengagement mechanism configured to suppress excessive rotation of the centrifugal pendulum damper and realize and cut off power transmission from the power transmitting shaft to the centrifugal pendulum damper.

A ninth aspect of the present invention is a power transmission apparatus with a centrifugal pendulum damper, the power transmission apparatus including: a speed-increasing mechanism configured to increase speed of rotation of a power transmitting shaft; a centrifugal pendulum damper coupled to the power transmitting shaft through the speed-increasing mechanism; and a clutch mechanism interposed between the power transmitting shaft and the speed-increasing mechanism and configured to realize and cut off power transmission from the power transmitting shaft to the speed-increasing mechanism, wherein: the speed-increasing mechanism is a single pinion type planetary gear set including a sun gear, a pinion carrier, and a ring gear; the pinion carrier is coupled to the clutch mechanism; the ring gear is fixed to a casing member; and the sun gear is coupled to the centrifugal pendulum damper.

Advantageous Effects of Invention

As above, according to the first aspect of the present invention, included is the engagement/disengagement mechanism capable of realizing and cutting off the power transmission from the power transmitting shaft to the centrifugal pendulum damper. Since the power transmission from the power transmitting shaft to the centrifugal pendulum damper is cut off by the engagement/disengagement mechanism under a circumstance where the power transmitting shaft is operated at comparatively high rotation, the centrifugal pendulum damper can be prevented from being increased in speed by the speed-increasing mechanism. Therefore, the centrifugal pendulum damper does not have to have a structure that can endure the centrifugal force during the high-speed rotation for the purpose of securing the reliability of the centrifugal pendulum damper. Thus, the reliability of the centrifugal pendulum damper can be secured while preventing the size increase of the centrifugal pendulum damper. Further, in the low-rotation range where the torque fluctuation is relatively or comparatively large, the engagement/disengagement mechanism is engaged, and with this, the torque fluctuation can be absorbed by the centrifugal pendulum damper. Therefore, according to the present invention, the torque fluctuation and the vibration noise of the vehicle are effectively suppressed while avoiding the size increase of the centrifugal pendulum damper and the deterioration of the reliability of the centrifugal pendulum damper by the high-speed rotation.

According to the second aspect of the present invention, the engagement/disengagement mechanism is provided so as to be capable of realizing and cutting off the power transmission from the power transmitting shaft to the speed-increasing mechanism. Since the power transmission from the power transmitting shaft to the speed-increasing mechanism is cut off by the engagement/disengagement mechanism under a circumstance where the power transmitting shaft which does not require the suppression of the torque fluctuation by the centrifugal pendulum damper is operated at comparatively high rotation, the speed-increasing mechanism can be prevented from being driven. Thus, power loss caused by driving the speed-increasing mechanism can be reduced.

According to the third aspect of the present invention, the engagement/disengagement mechanism includes the first engagement/disengagement mechanism and the second engagement/disengagement mechanism. The first engagement/disengagement mechanism and the speed-increasing mechanism are interposed on the first power transmission path extending between the power transmitting shaft and the centrifugal pendulum damper, and the second engagement/disengagement mechanism is interposed on the second power transmission path formed independently from the first power transmission path and extending between the power transmitting shaft and the centrifugal pendulum damper. Since the power transmission from the power transmitting shaft to the centrifugal pendulum damper on the first power transmission path and the second power transmission path is cut off by the first engagement/disengagement mechanism and the second engagement/disengagement mechanism under a circumstance where the power transmitting shaft is operated at comparatively high rotation, the power can be prevented from being transmitted to the centrifugal pendulum damper. Further, under a circumstance where the power transmitting shaft is operated at comparatively low rotation and high load, the power transmission from the power transmitting shaft through the speed-increasing mechanism to the centrifugal pendulum damper on the first power transmission path is cut off by the first engagement/disengagement mechanism, and the power is transmitted by the second engagement/disengagement mechanism from the power transmitting shaft to the centrifugal pendulum damper on the second power transmission path. With this, the centrifugal pendulum damper is not increased in speed by the speed-increasing mechanism and can be rotated at the same speed as the power transmitting shaft. Further, under a circumstance where the power transmitting shaft is operated at comparatively low rotation and low load, the power transmission from the power transmitting shaft to the centrifugal pendulum damper on the second power transmission path is cut off by the second engagement/disengagement mechanism, and the power is transmitted by the first engagement/disengagement mechanism from the power transmitting shaft through the speed-increasing mechanism to the centrifugal pendulum damper on the first power transmission path. With this, the centrifugal pendulum damper can be increased in speed by the speed-increasing mechanism. Therefore, by controlling the engagement and disengagement of the engagement/disengagement mechanisms, the centrifugal pendulum damper can be switched to a speed-increasing state, a same-speed state, or a cut-off state. Thus, appropriate control can be performed in accordance with an operation state of the vehicle.

According to the fourth aspect of the present invention, the speed-increasing mechanism is the single pinion type planetary gear set including the sun gear, the pinion carrier, and the ring gear, and the carrier is coupled to the power transmitting shaft. Further, one of the sun gear and the ring gear is coupled to the centrifugal pendulum damper, and the other of the sun gear and the ring gear is coupled to the restraining unit configured to restrain the rotation of the other of the sun gear and the ring gear. Therefore, the configuration of the power transmission apparatus with the centrifugal pendulum damper according to the invention recited in claim 1 is embodied, and the above effects are realized by the embodied power transmission apparatus with the centrifugal pendulum damper.

On the other hand, according to the fifth aspect of the present invention, the speed-increasing mechanism is the double pinion type planetary gear set including the sun gear, the pinion carrier, and the ring gear, and the ring gear is coupled to the power transmitting shaft. Further, one of the sun gear and the carrier is coupled to the centrifugal pendulum damper, and the other of the sun gear and the carrier is coupled to the restraining unit configured to restrain the rotation of the other of the sun gear and the carrier. Therefore, the configuration of the power transmission apparatus with the centrifugal pendulum damper according to the invention recited in claim 1 is embodied, and the above effects are realized by the embodied power transmission apparatus with the centrifugal pendulum damper.

According to the sixth aspect of the present invention, the speed-increasing mechanism is the planetary gear set including the sun gear, the pinion carrier, and the ring gear, and the engagement/disengagement mechanism is the brake mechanism capable of braking the rotation of any one of the sun gear, pinion carrier, and ring gear of the planetary gear set. Typically, the brake mechanism is not affected by centrifugal hydraulic pressure unlike the clutch mechanism. Therefore, control accuracy of the engagement/disengagement mechanism can be improved by using the brake mechanism as the engagement/disengagement mechanism.

According to the seventh aspect of the present invention, the engagement/disengagement mechanism suppresses the excessive rotation of the centrifugal pendulum damper. Since the power transmission from the power transmitting shaft to the centrifugal pendulum damper is cut off by the engagement/disengagement mechanism, the centrifugal pendulum damper can be prevented from being increased in speed by the speed-increasing mechanism. Therefore, the centrifugal pendulum damper does not have to have a structure that can endure the centrifugal force during the high-speed rotation for the purpose of securing the reliability of the centrifugal pendulum damper. Thus, the reliability of the centrifugal pendulum damper can be secured while preventing the size increase of the centrifugal pendulum damper.

According to the eighth aspect of the present invention, included is the engagement/disengagement mechanism configured to suppress the excessive rotation of the centrifugal pendulum damper and capable of realizing and cutting off the power transmission from the power transmitting shaft to the centrifugal pendulum damper. Therefore, under a circumstance where the power transmitting shaft is operated at comparatively high rotation, the power transmission to the centrifugal pendulum damper can be cut off by the engagement/disengagement mechanism such that the excessive rotation of the centrifugal pendulum damper is prevented. On this account, the centrifugal pendulum damper does not have to have a structure that can endure the centrifugal force during the high-speed rotation for the purpose of securing the reliability of the centrifugal pendulum damper. Thus, the reliability of the centrifugal pendulum damper can be secured while preventing the size increase of the centrifugal pendulum damper.

According to the ninth aspect of the present invention, included is the clutch mechanism interposed between the power transmitting shaft and the speed-increasing mechanism and capable of realizing the power transmission from the power transmitting shaft to the speed-increasing mechanism, and the speed-increasing mechanism is the single pinion type planetary gear set including the sun gear, the pinion carrier, and the ring gear. Further, the pinion carrier is coupled to the clutch mechanism, the ring gear is fixed to the casing member, and the sun gear is coupled to the centrifugal pendulum damper. Therefore, when the power is transmitted from the power transmitting shaft to the carrier by the clutch mechanism under a circumstance where the power transmitting shaft is operated at comparatively low rotation, the rotation of the centrifugal pendulum damper is increased in speed together with the rotation of the sun gear. In contrast, when the power transmission to the carrier is cut off by the clutch mechanism under a circumstance where the power transmitting shaft is operated at comparatively high rotation, the power is not transmitted to the centrifugal pendulum damper coupled to the sun gear. Therefore, the centrifugal pendulum damper does not have to have a structure that can endure the centrifugal force during the high-speed rotation for the purpose of securing the reliability of the centrifugal pendulum damper. Thus, the reliability of the centrifugal pendulum damper can be secured while preventing the size increase of the centrifugal pendulum damper.

BRIEF DESCRIPTION OF DRAWINGS

FIGS. 7A and 7B are conceptual diagrams each showing operation regions of the power transmission apparatus with the centrifugal pendulum damper shown in FIG. 6.

FIG. 8 is a table showing states of engagement/disengagement mechanisms in the respective operation regions of FIG. 7.

DESCRIPTION OF EMBODIMENTS

Hereinafter, embodiments of the present invention will be explained.

Embodiment 1

Figure 1:
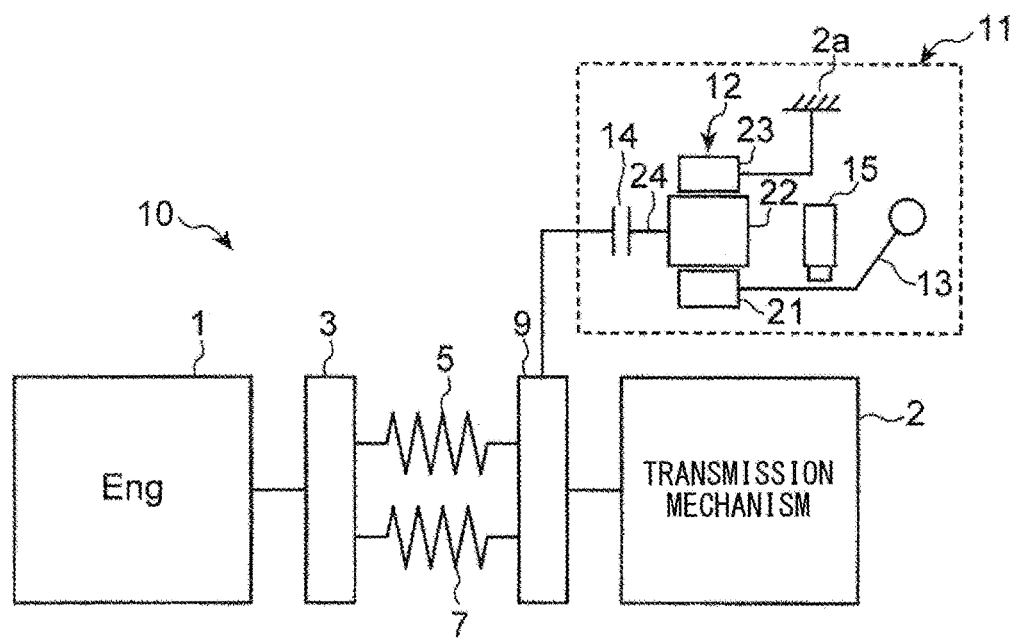
FIG. 1 is a diagram showing a vibration model of a vehicle drive system including a power transmission apparatus with a centrifugal pendulum damper according to Embodiment 1 of the present invention.

FIG. 1 is a diagram showing a vibration model of a vehicle drive system including a power transmission apparatus with a centrifugal pendulum damper according to Embodiment 1 of the present invention. As shown in FIG. 1, power transmission from an engine 1 that is a driving source to a transmission mechanism 2 configured to change the speed of the rotation to a driving wheel (not shown) is performed through a power transmission apparatus 10 with a centrifugal pendulum damper (hereinafter simply referred to as a "power transmission apparatus 10").

The power transmission apparatus 10 includes a torsional damper mechanism coupling an engine-side power transmission member 3 and a transmission-side power transmission member 9. The engine-side power transmission member 3 serves as an output member of the engine 1, and the transmission-side power transmission member 9 serves as an input member provided at one side of the transmission mechanism 2 which side is close to the engine 1. The torsional damper mechanism includes a first spring member 5 and a second spring member 7 which are coupled to the engine-side power transmission member 3 and the transmission-side power transmission member 9 so as to be provided in parallel between the engine-side power transmission member 3 and the transmission-side power transmission member 9. With this, the rotation of the engine-side power transmission member 3 is transmitted to the transmission-side power transmission member 9 through the spring members 5 and 7. It should be noted that the "transmission-side power transmission member 9" of the present embodiment corresponds to a "power transmitting shaft" of claim 1.

The power transmission apparatus 10 further includes a centrifugal pendulum damper mechanism 11 coupled to the transmission-side power transmission member 9. The centrifugal pendulum damper mechanism 11 includes: a planetary gear set 12 that is a speed-increasing mechanism configured to increase the speed of the rotation of the transmission-side power transmission member 9; a centrifugal pendulum damper 13 coupled to the transmission-side power transmission member 9 through the planetary gear set 12; and a clutch mechanism 14 that is an engagement/disengagement mechanism capable of realizing and cutting off the power transmission from the transmission-side power transmission member 9 to the centrifugal pendulum damper 13.

In the present embodiment, the planetary gear set 12 is a single pinion type and includes, as rotational elements, a sun gear 21, a ring gear 23, and a pinion carrier 24 (hereinafter simply abbreviated as a "carrier 24") supporting a pinion 22 that meshes with the sun gear 21 and the ring gear 23.

The transmission-side power transmission member 9 is coupled to the carrier 24 of the planetary gear set 12 through the clutch mechanism 14, and the centrifugal pendulum damper 13 is coupled to the sun gear 21. Further, a first casing member 2a is coupled to the ring gear 23, so that the rotation of the ring gear 23 is restrained.

The centrifugal pendulum damper mechanism 11 further includes a rotating speed sensor 15 configured to detect a rotating speed of the sun gear 21 of the planetary gear set 12, the sun gear 21 being the rotational element located at one side of the clutch mechanism 14 which side is close to the centrifugal pendulum damper 13.

Next, a speed increasing operation by the planetary gear set 12 will be explained in reference to FIG. 2.

Figure 2:
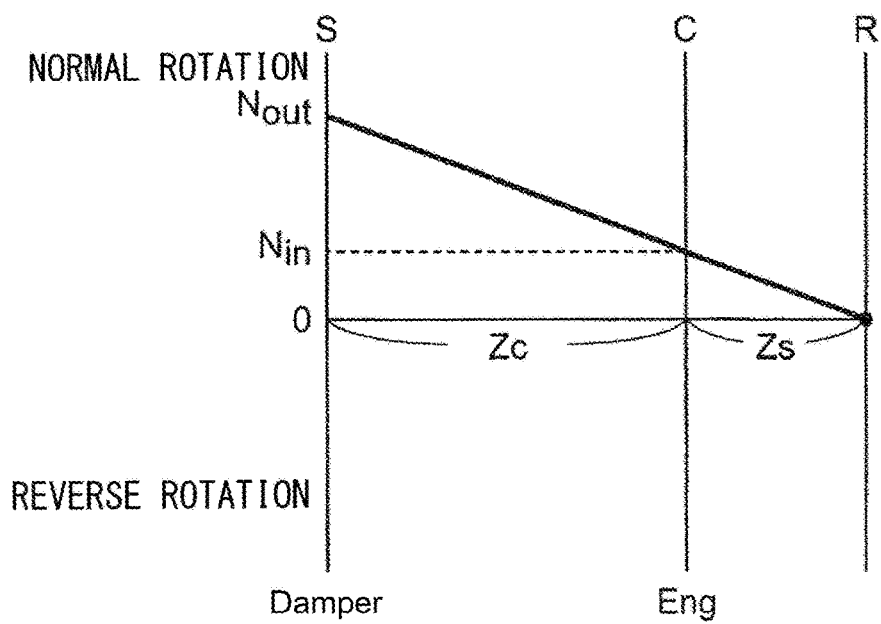
FIG. 2 is a speed diagram of a speed-increasing mechanism of the power transmission apparatus with the centrifugal pendulum damper shown in FIG. 1.

FIG. 2 is a speed diagram of the planetary gear set 12 that is the speed-increasing mechanism of the power transmission apparatus 10 shown in FIG. 1. In FIG. 2, the sun gear 21, the carrier 24, and the ring gear 23 are abbreviated as "S", "C", and "R," respectively. As shown in FIG. 2, since the ring gear 23 is being fixed, the rotation input from an input shaft 9 to the carrier 24 is changed in speed based on Zs:Zc that is a gear ratio of the sun gear 21 and the carrier 24, and the rotation is then output through the sun gear 21. At this time, the sun gear 21 rotates in the same rotational direction as the carrier 24 (normal rotation), so that a relation "Nout=Nin×(Zs+Zc)/Zs" is satisfied, where Nin denotes an input rotation speed of the carrier 24, and Nout denotes an output rotation speed of the sun gear 21. Therefore, needless to say, the output rotation speed Nout becomes higher than the input rotation speed Nin. Thus, the rotation input from the input shaft 9 is increased in speed by the planetary gear set 12 to be transmitted to the centrifugal pendulum damper 13.

Next, a specific example where the power transmission apparatus of the present invention is applied to an automatic transmission not including a torque converter will be explained in detail in reference to FIG. 3.

Figure 3:
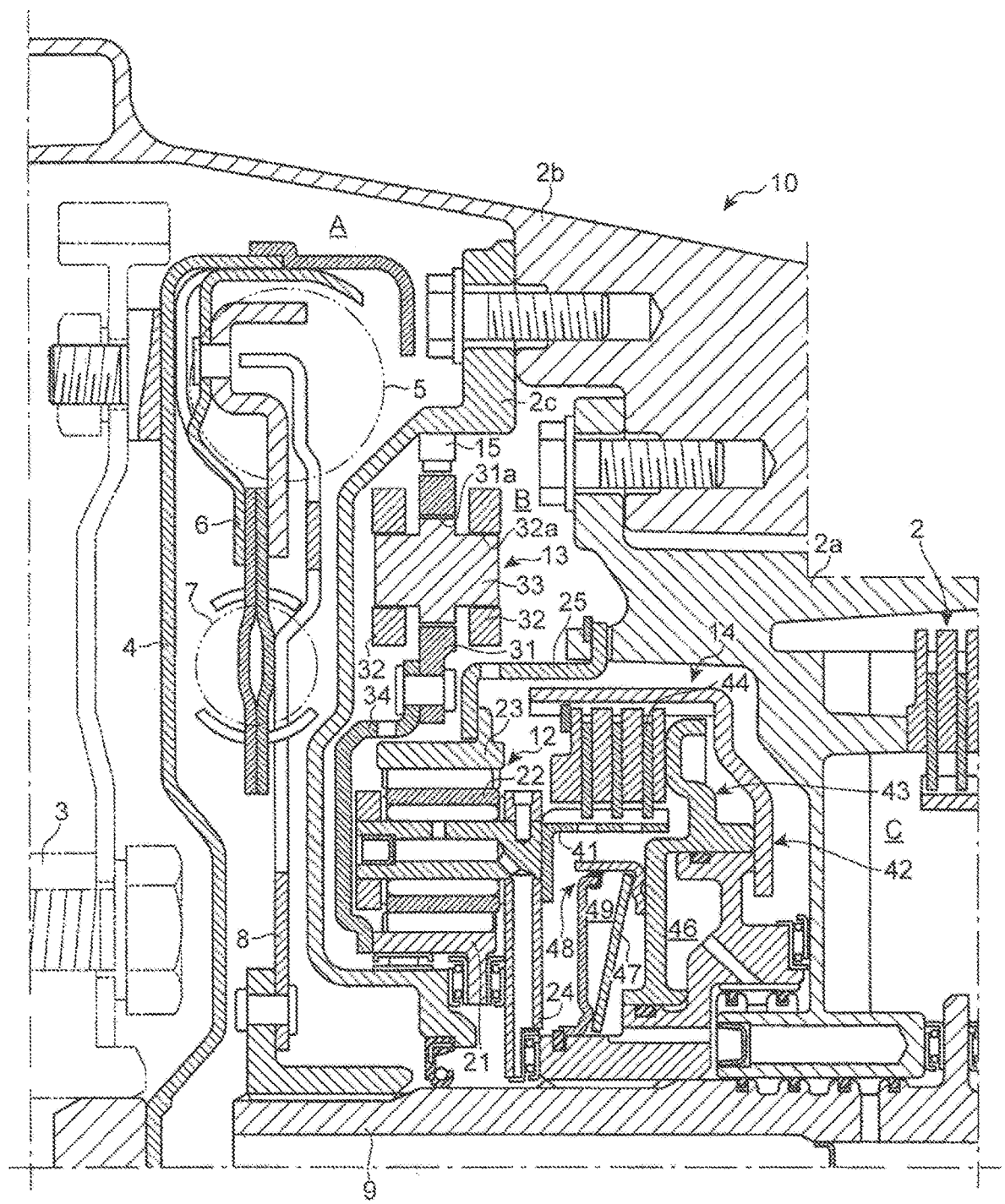
FIG. 3 is a longitudinal sectional view showing an advantageous embodiment of the power transmission apparatus with the centrifugal pendulum damper shown in FIG. 1.

FIG. 3 is a longitudinal sectional view showing an advantageous embodiment of the power transmission apparatus 10 shown in FIG. 1. As shown in FIG. 3, the power transmission apparatus 10 is accommodated in a second casing member 2b coupled to the first casing member 2a accommodating the transmission mechanism 2. The first casing member 2a, the second casing member 2b, and the components accommodated in these casing members 2a and 2b constitute the automatic transmission, and the automatic transmission is coupled to the engine 1. The second casing member 2b includes an opening portion at one axial side close to the engine 1, and the opening portion is closed by a cover member 2c. An internal space of the second casing member 2b is divided by the cover member 2c into a space A close to the engine 1 and a space B close to the transmission mechanism 2. The first casing member 2a is configured to close one side, close to the engine 1, of a space C with respect to the space B, the space C accommodating the transmission mechanism 2. The input shaft 9 (corresponding to the "transmission-side power transmission member 9" of FIG. 1) of the transmission mechanism 2 penetrates the cover member 2c such that a tip end portion of the input shaft 9 projects into the space A.

Torsional Damper Mechanism

As a torsional damper mechanism, an input plate 4, first coil springs 5 (corresponding to the "first spring member 5" of FIG. 1), a holding plate 6, second coil springs 7 (corresponding to the "second spring member 7" of FIG. 1), and an output plate 8 are provided in the space A located close to the engine 1.

An output shaft 3 (corresponding to the "engine-side power transmission member 3" of FIG. 1) of the engine 1 is fixed to the input plate 4 having a circular plate shape through a drive plate, and the input plate 4 rotates concentrically with the output shaft 3 in accordance with the rotation of the output shaft 3. The holding plate 6 is fixed to the input plate 4 by welding or the like. The holding plate 6 holds a plurality of first coil springs 5 arranged in a circumferential direction and a plurality of second coil springs 7 arranged in the circumferential direction and located at an inner periphery side of the first coil spring 5. An outer peripheral portion of the holding plate 6 is engaged with one end of each first coil spring 5, and an inner peripheral portion of the holding plate 6 is engaged with one end of each second coil spring 7 such that these coil springs 5 and 7 are arranged in parallel on a power transmission path. An outer peripheral portion of the output plate 8 is engaged with the other end of each first coil spring 5 and the other end of each second coil spring 7, and an inner peripheral portion of the output plate 8 is splined to the input shaft 9 of the transmission mechanism 2. With this, the rotation of the output shaft 3 of the engine 1 is transmitted through the coil springs 5 and 7 to the input shaft 9 of the transmission mechanism 2.

In the space B formed in the second casing member 2b and located close to the transmission mechanism 2, the planetary gear set 12, the centrifugal pendulum damper 13, the clutch mechanism 14, and the rotating speed sensor 15 are arranged on a center axis of the input shaft 9. The planetary gear set 12 is arranged at an inner periphery side of a part of the space B which part is close to the engine 1, and the centrifugal pendulum damper 13 is arranged at an outer periphery side of the planetary gear set 12. The clutch mechanism 14 is arranged at one side of the planetary gear set 12 which side is close to the transmission mechanism 2. Hereinafter, the planetary gear set 12, the centrifugal pendulum damper 13, the clutch mechanism 14, and the rotating speed sensor 15 will be explained in detail.

Speed-Increasing Mechanism

As described above, the planetary gear set 12 is a single pinion type planetary gear set configured such that the pinion 22 supported by the carrier 24 directly mesh with the sun gear 21 and the ring gear 23.

The planetary gear set 12 is provided between the input shaft 9 and the centrifugal pendulum damper 13 in a radial direction. The carrier 24 of the planetary gear set 12 is coupled to a below-described clutch hub 41 of the clutch mechanism 14 and further coupled to the input shaft 9 of the transmission mechanism 2 through the clutch mechanism 14. The sun gear 21 is coupled to a below-described supporting member 31 of the centrifugal pendulum damper 13 through a coupling member 34. Further, the ring gear 23 is coupled to the first casing member 2a through a coupling member 25.

When the input shaft 9 of the transmission mechanism 2 rotates, and the clutch mechanism 14 is engaged, the carrier 24 of the planetary gear set 12 rotates. Since the ring gear 23 is coupled to the first casing member 2a, and the rotation of the ring gear 23 is restrained, the sun gear 21 rotates in accordance with the rotation of the carrier 24. As described above, the rotation of the sun gear 21 is increased in speed from the rotation of the carrier 24 in accordance with the gear ratio of the carrier 24 to the sun gear 21. Therefore, the rotation input from the input shaft 9 is increased in speed by the planetary gear set 12 to be transmitted to the centrifugal pendulum damper 13.

Centrifugal Pendulum Damper

The centrifugal pendulum damper 13 includes: the supporting member 31 having an annular plate shape; and a plurality of pendulums 32 that are mass bodies supported by the supporting member 31. An elongated hole 31a is formed at the supporting member 31 so as to penetrate the supporting member 31 in an axial direction, and an elongated hole 32a is formed at each pendulum 32 so as to penetrate the pendulum 32 in the axial direction. A plurality of support pins 33 are inserted into the elongated holes 31a and 32a so as to be movable forward and rearward in the circumferential direction. The pendulums 32 are supported by the support pins 33 so as to be swingable relative to the supporting member 31 around a point on a circumference having a predetermined radius from a center axis of the supporting member 31.

The supporting member 31 is coupled to the sun gear 2 of the planetary gear set 12 by the coupling member 34 which is located at one side, close to the engine, of the planetary gear set 12, extends outward in the radial direction, and has an annular plate shape. The coupling member 34 is formed such that an inner peripheral portion thereof is located at one axial side, close to the engine 1, of an outer peripheral portion thereof. The planetary gear set 12 is provided at one axial side, close to the transmission mechanism 21, of the inner peripheral portion of the coupling member 34.

When the input shaft 9 rotates, the supporting member 31 rotates in accordance with the rotation of the sun gear 21 of the planetary gear set 12. Then, when the torque fluctuation is transmitted to the supporting member 31, the support pin 33 swings forward and rearward in the circumferential direction in the elongated hole 31a of the supporting member 31, and the pendulum 32 swings relative to the support pin 33 forward and rearward in the circumferential direction within the range of the elongated hole 32a. When the pendulum 32 swings, component force in the circumferential direction is generated at the supporting member 31 that receives centrifugal force acting on the pendulums 32. This component force serves as anti-torque that suppresses the torque fluctuation of the supporting member 31 and the input shaft 9.

In the present embodiment, to improve the damping performance by increasing the weights of the mass bodies, each of pairs of pendulums 32 are provided so as to sandwich the supporting member 31 from both sides in the axial direction and are supported by the same support pin 33 so as to be integrally swingable.

To detect the rotating speed of the supporting member 31 by the rotating speed sensor 15, a large number of detected teeth (not shown) are formed on an outer peripheral surface of the supporting member 31 so as to be lined up in the circumferential direction.

Engagement/Disengagement Mechanism

As shown in FIG. 3, the clutch mechanism 14 includes: the clutch hub 41 and a clutch drum 42 which are arranged concentrically; a plurality of friction plates 44 arranged between the clutch hub 41 and the clutch drum 42 and alternately engaged with the clutch hub 41 and the clutch drum 42; and a piston 43 configured to press the plurality of friction plates 44.

The clutch drum 42 is splined to the input shaft 9 and rotates around the center axis of the input shaft 9 in accordance with the rotation of the input shaft 9. One end portion of the clutch hub 41 which portion is close to the engine 1 is coupled to the carrier 24 of the planetary gear set 12. The plurality of friction plates 44 alternately engaged with the clutch drum 42 and the clutch hub 41 are provided between a cylindrical portion of the clutch drum 42 and a cylindrical portion of the clutch hub 41, the cylindrical portions being opposed to each other. The piston 43 configured to press the friction plates 44 is arranged inside the clutch drum 42. A hydraulic chamber 46 to which engagement oil pressure is supplied is defined by the clutch drum 42 and the piston 43. Further, a return spring 47 is provided and constituted by a disc spring that biases the piston 43 so as to disengage the friction plates 44 when the oil pressure is not supplied to the hydraulic chamber 46.

When the engagement oil pressure is supplied to the hydraulic chamber 46, the friction plates 44 are pressed by the engagement oil pressure through the piston 43. Thus, the clutch mechanism 14 is engaged.

In the present embodiment, a centrifugal balance chamber forming member 48 is formed at a back portion of the piston 43, and a centrifugal balance chamber 49 is defined by the centrifugal balance chamber forming member 48 and the piston 43. When operating oil is introduced to the centrifugal balance chamber 49, centrifugal force acting on the operating oil cancels centrifugal force acting on operating oil in the hydraulic chamber 46. Thus, the piston 43 can be prevented from moving in an engagement direction when the clutch mechanism 14 is in a disengaged state.

Rotating Speed Sensor

The rotating speed sensor 15 outputs a detection signal corresponding to the rotating speed of the centrifugal pendulum damper 13. Examples of the rotating speed sensor 15 include a pickup coil type magnetic sensor, a hall element type magnetic sensor, and a magnetoresistive element type magnetic sensor.

For example, when a pickup type magnetic sensor is used as the rotating speed sensor 15, the rotating speed sensor 15 is fixed to the cover member 2c so as to face the outer peripheral surface of the supporting member 31 of the centrifugal pendulum damper 13. The rotating speed sensor 15 detects, by a rotation detecting element incorporated therein, the detected teeth formed on the outer peripheral surface of the supporting member 31 and outputs the detection signal corresponding to the rotating speed of the centrifugal pendulum damper 13. Engagement/disengagement control of the clutch mechanism 14 is performed based on the detection signal.

Actions of Power Transmission Apparatus

Next, the actions of the power transmission apparatus 10 including the above components will be explained.

First, the power of the engine 1 is transmitted to the torsional damper mechanism. At this time, the torque fluctuation of the engine 1 is input to the torsional damper mechanism of the power transmission apparatus 10 to be absorbed by the torsional damper mechanism to some extent. The power output from the torsional damper mechanism is transmitted to the clutch mechanism 14 through the input shaft 9 of the transmission mechanism 2 located at an inner periphery side of the torsional damper mechanism.

Next, when the rotation of the engine 1 is low, the clutch mechanism 14 is engaged, so that the power is transmitted from the input shaft 9 of the transmission mechanism 2 through the planetary gear set 12 to the centrifugal pendulum damper 13. At this time, the rotation of the input shaft 9 is increased in speed since the rotation of the input shaft 9 is input to the carrier 24 of the planetary gear set 12 in which the ring gear 23 is being fixed, and the rotation is then output from the sun gear 21. The centrifugal pendulum damper 13 is driven by the increased rotating speed of the sun gear 21. At this time, the remaining torque fluctuation that has not been absorbed by the torsional damper is absorbed by the centrifugal pendulum damper 13. Especially, since the centrifugal pendulum damper 13 is increased in speed, the torque fluctuation is efficiently absorbed.

The rotating speed of the supporting member 31 of the centrifugal pendulum damper 13 is detected by the rotating speed sensor 15. When the rotation of the engine 1 becomes high, and the rotating speed of the centrifugal pendulum damper 13 exceeds a predetermined value, the clutch mechanism 14 is disengaged, and the power is not transmitted from the input shaft 9 of the transmission mechanism 2 to the centrifugal pendulum damper 13. It should be noted that in consideration of, for example, the centrifugal force acting on the centrifugal pendulum damper 13, the predetermined value of the rotating speed of the centrifugal pendulum damper 13 is set as a highest rotating speed at which the reliability of the centrifugal pendulum damper 13 can be secured while preventing the size increase of the centrifugal pendulum damper 13.

In the present embodiment, the power transmission apparatus 10 includes an input shaft rotating speed sensor (not shown) configured to detect the rotating speed of the input shaft 9 of the transmission mechanism 2. When the rotation of the engine 1 becomes low again, and the rotating speed of the input shaft 9 becomes a predetermined value or less, the clutch mechanism 14 is engaged. It should be noted that the predetermined value of the rotating speed of the input shaft 9 is set as such a rotating speed that the rotating speed of the centrifugal pendulum damper 13 increased by the planetary gear set 12 when the clutch mechanism 14 is engaged becomes the above-described highest rotating speed.

Even after that, the engagement/disengagement control of the clutch mechanism 14 is performed based on the rotating speed of the centrifugal pendulum damper 13 detected by the rotating speed sensor 15 and the rotating speed of the input shaft 9 detected by the input shaft rotating speed sensor. It should be noted that the engagement/disengagement control of the clutch mechanism 14 may be performed based only on the detected value of the input shaft rotating speed sensor.

It should be noted that the rotating speed sensor 15 configured to directly measure the rotating speed of the centrifugal pendulum damper 13 is not directly used for the engagement/disengagement control of the clutch mechanism 14. The rotating speed sensor 15 is a sensor used to realize fail safe by detection of breakdown of the rotating speed sensor 15. The breakdown of the rotating speed sensor 15 is detected by a comparison between the detected value of the rotating speed of the centrifugal pendulum damper 13 detected by the rotating speed sensor 15 and a calculated value of the rotating speed of the centrifugal pendulum damper 13 calculated based on the detected value of the input shaft rotating speed sensor.

As above, the present embodiment includes the clutch mechanism 14 capable of realizing and cutting off the power transmission from the input shaft 9 to the centrifugal pendulum damper 13. Since the power transmission from the input shaft 9 to the centrifugal pendulum damper 13 is cut off by the clutch mechanism 14 under a circumstance where the input shaft 9 is operated are comparatively high rotation, the centrifugal pendulum damper 13 can be prevented from being increased in speed by the planetary gear set 12. Therefore, the centrifugal pendulum damper 13 does not have to have a structure that can endure the centrifugal force during the high-speed rotation for the purpose of securing the reliability of the centrifugal pendulum damper 13. Thus, the reliability of the centrifugal pendulum damper 13 can be secured while preventing the size increase of the centrifugal pendulum damper 13. Further, in a low-rotation range where the torque fluctuation is large, the clutch mechanism 14 is engaged, and with this, the torque fluctuation can be absorbed by the centrifugal pendulum damper 13. To be specific, according to the present embodiment, the torque fluctuation and vibration noise of the vehicle are effectively suppressed while avoiding the size increase of the centrifugal pendulum damper 13 and the deterioration of the reliability of the centrifugal pendulum damper 13 by the high-speed rotation.

Embodiment 2

Next, a power transmission apparatus 110 with a centrifugal pendulum damper according to Embodiment 2 shown in FIG. 4 will be explained. In the following, explanations of components that are the same as those of the above embodiment are omitted, and the same reference signs are used in the drawings.

Figure 4:
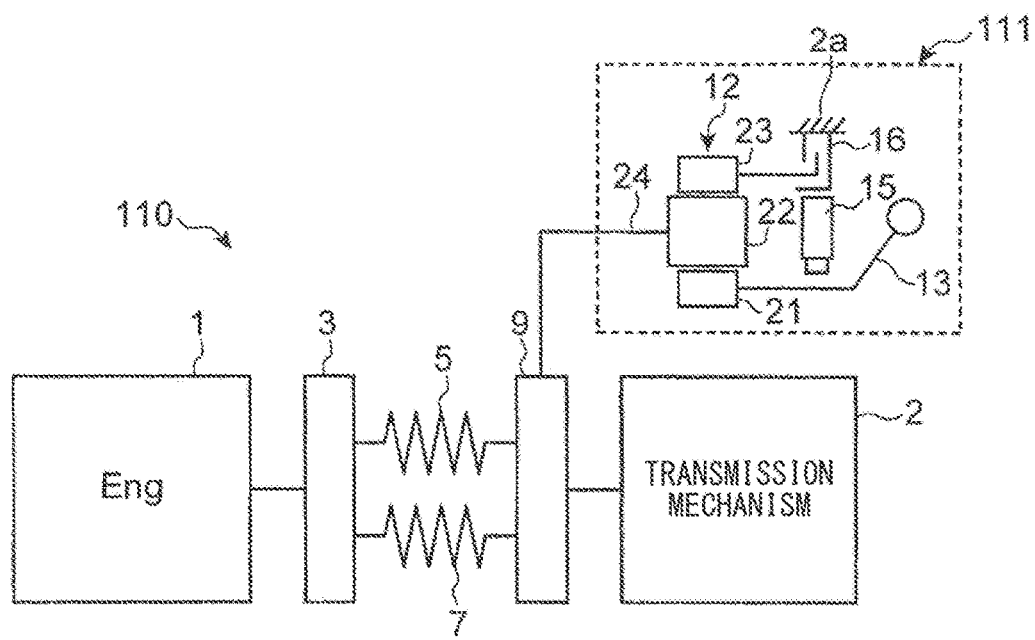
FIG. 4 is a diagram showing a vibration model of the vehicle drive system including the power transmission apparatus with the centrifugal pendulum damper according to Embodiment 2.

FIG. 4 is a diagram showing a vibration model of the vehicle drive system including the power transmission apparatus with the centrifugal pendulum damper according to Embodiment 2. As shown in FIG. 4, the power transmission apparatus 110 is different from the power transmission apparatus 10 of Embodiment 1 only regarding a centrifugal pendulum damper mechanism 111.

To be specific, the centrifugal pendulum damper mechanism 111 includes: the planetary gear set 12 that is the speed-increasing mechanism configured to increase the speed of the rotation of the input shaft 9; the centrifugal pendulum damper 13 coupled to the input shaft 9 through the planetary gear set 12; and a brake mechanism 16 that is an engagement/disengagement mechanism capable of realizing and cutting off the power transmission from the input shaft 9 to the centrifugal pendulum damper 13.

The brake mechanism 16 is provided between the first casing member 2a and the ring gear 23 and connects and disconnects the first casing member 2a and the ring gear 23. When the brake mechanism 16 is engaged, the rotation of the ring gear 23 of the planetary gear set 12 is restrained. With this, the power of the input shaft 9 is transmitted from the carrier 24 of the planetary gear set 12 to the sun gear 21. In contrast, when the brake mechanism 16 is disengaged, the ring gear 23 just idles even by the rotation of the carrier 24 of the planetary gear set 12, and the power of the input shaft 9 is not transmitted from the carrier 24 to the sun gear 21.

In the present embodiment, when the engine 1 is started up, and the rotating speed of the centrifugal pendulum damper 13 is the predetermined value or less, the brake mechanism 16 is engaged, so that the power is transmitted from the input shaft 9 of the transmission mechanism 2 through the planetary gear set 12 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 12 exceeds the predetermined value, the brake mechanism 16 is disengaged. During this time, the power is not transmitted from the input shaft 9 of the transmission mechanism 2 through the planetary gear set 12 to the centrifugal pendulum damper 13. After that, the brake mechanism 16 is engaged or disengaged in accordance with the rotating speed of the centrifugal pendulum damper 13.

In the present embodiment, even when the brake mechanism 16 is disengaged, the carrier 24 of the planetary gear set 12 rotates in accordance with the rotation of the input shaft 9. Therefore, inertia of the power transmission apparatus 10 is larger than that of Embodiment 1, and this slightly affects the fuel efficiency.

Embodiment 3

Next, a power transmission apparatus 120 with a centrifugal pendulum damper according to Embodiment 3 shown in FIG. 5 will be explained. In the following, explanations of components that are the same as those of the above embodiments are omitted, and the same reference signs are used in the drawings.

Figure 5:
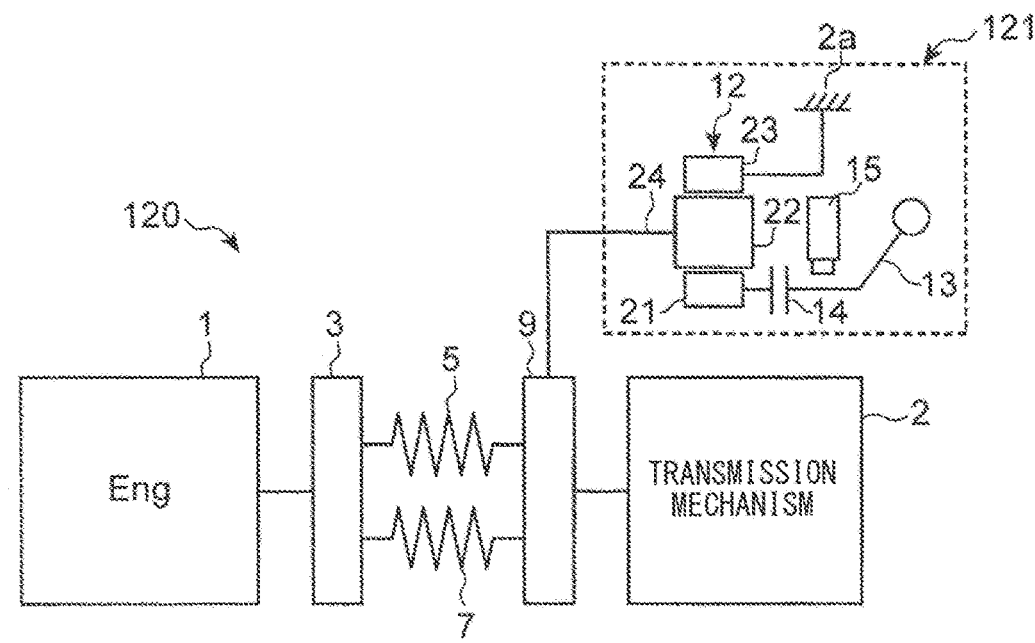
FIG. 5 is a diagram showing a vibration model of the vehicle drive system including the power transmission apparatus with the centrifugal pendulum damper according to Embodiment 3.

FIG. 5 is a diagram showing a vibration model of the vehicle drive system including the power transmission apparatus with the centrifugal pendulum damper according to Embodiment 3. As shown in FIG. 5, the power transmission apparatus 120 is different from the power transmission apparatus 10 of Embodiment 1 only regarding a centrifugal pendulum damper mechanism 121.

To be specific, the centrifugal pendulum damper mechanism 121 includes: the planetary gear set 12 that is the speed-increasing mechanism configured to increase the speed of the rotation of the input shaft 9; the centrifugal pendulum damper 13 coupled to the input shaft 9 through the planetary gear set 12; and the clutch mechanism 14 that is an engagement/disengagement mechanism capable of realizing and cutting off the power transmission from the sun gear 21 of the planetary gear set 12 to the centrifugal pendulum damper 13.

The clutch mechanism 14 is provided between the sun gear 21 of the planetary gear set 12 and the centrifugal pendulum damper 13 and connects and disconnects the sun gear 21 of the planetary gear set 12 and the centrifugal pendulum damper 13. When the clutch mechanism 14 is engaged, the power of the input shaft 9 is transmitted from the sun gear 21 of the planetary gear set 12 to the centrifugal pendulum damper 13. In contrast, when the clutch mechanism 14 is disengaged, the power of the input shaft 9 is not transmitted from the sun gear 21 to the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 12 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 12 exceeds the predetermined value, the clutch mechanism 14 is disengaged. During this time, the power is not transmitted from the input shaft 9 of the transmission mechanism 2 through the planetary gear set 12 to the centrifugal pendulum damper 13. After that, the clutch mechanism 14 is engaged or disengaged in accordance with the rotating speed of the centrifugal pendulum damper 13.

In the present embodiment, even when the clutch mechanism 14 is disengaged, the carrier 24 and sun gear 21 of the planetary gear set 12 rotate in accordance with the rotation of the input shaft 9. Therefore, inertia of the power transmission apparatus 120 is larger than that of Embodiments 1 and 2, so that the fuel efficiency deteriorates.

Embodiment 4

Next, a power transmission apparatus 130 with a centrifugal pendulum damper according to Embodiment 4 shown in FIG. 6 will be explained. In the following, explanations of components that are the same as those of the above embodiments are omitted, and the same reference signs are used in the drawings.

Figure 6:
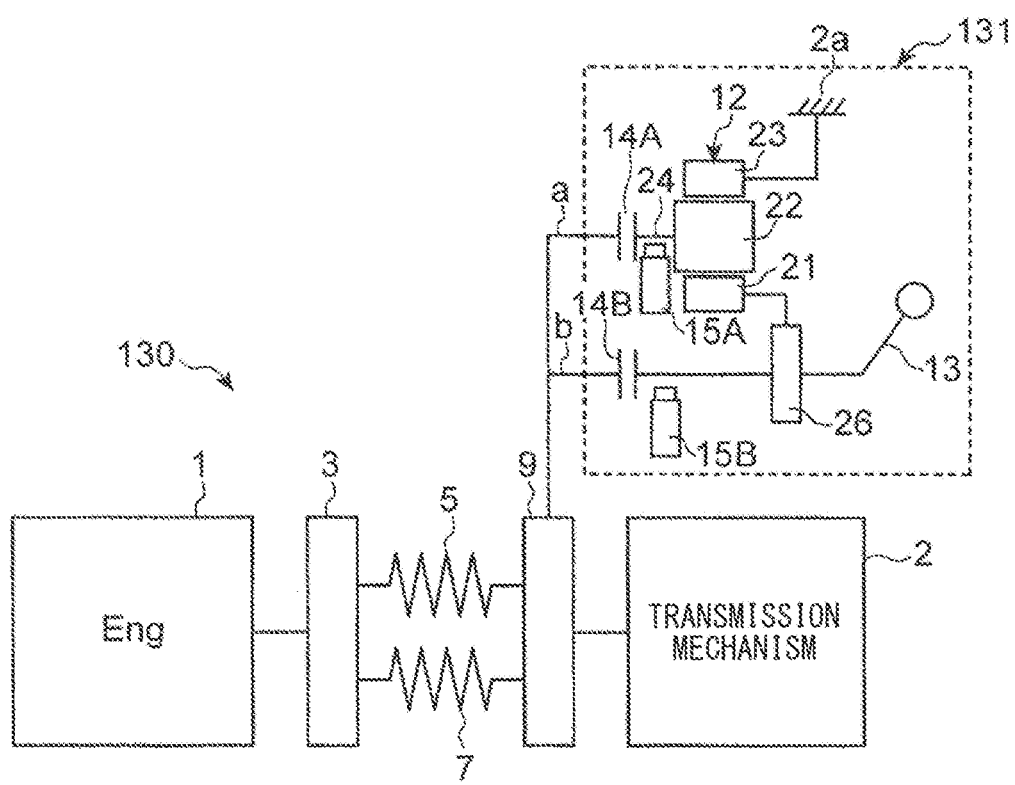
FIG. 6 is a diagram showing a vibration model of the vehicle drive system including the power transmission apparatus with the centrifugal pendulum damper according to Embodiment 4.

FIG. 6 is a diagram showing a vibration model of the vehicle drive system including the power transmission apparatus with the centrifugal pendulum damper according to Embodiment 4. As shown in FIG. 6, the power transmission apparatus 130 is different from the power transmission apparatus 10 of Embodiment 1 only regarding a centrifugal pendulum damper mechanism 131.

The centrifugal pendulum damper mechanism 131 includes: the planetary gear set 12 that is the speed-increasing mechanism configured to increase the speed of the rotation of the input shaft 9; a gear 26 that meshes with the sun gear 21 of the planetary gear set 12; the centrifugal pendulum damper 13 coupled to the input shaft 9 through the gear 26; a first clutch mechanism 14A that is an engagement/disengagement mechanism capable of realizing and cutting off a first power transmission path on which the power is transmitted from the input shaft 9 through the sun gear 21 of the planetary gear set 12 to the centrifugal pendulum damper 13; and a second clutch mechanism 14B that is an engagement/disengagement mechanism capable of realizing and cutting off a second power transmission path on which the power is transmitted from the input shaft 9 to the centrifugal pendulum damper 13 without through the planetary gear set 12.

The first clutch mechanism 14A is provided between the input shaft 9 and the carrier 24 of the planetary gear set 12 on the first power transmission path and connects and disconnects the input shaft 9 and the carrier 24 of the planetary gear set 12. The second clutch mechanism 14B is provided between the input shaft 9 and the gear 26 on the second power transmission path and connects and disconnects the input shaft 9 and the gear 26.

The centrifugal pendulum damper mechanism 131 includes: a first rotating speed sensor 15A configured to detect the rotating speed of a rotational element of the first clutch mechanism 14A which element is close to the planetary gear set 12; and a rotating speed sensor 15B configured to detect the rotating speed of a rotational element of the second clutch mechanism 14B which element is close to the centrifugal pendulum damper 13.

When the first clutch mechanism 14A is engaged, and the second clutch mechanism 14B is disengaged, the power of the input shaft 9 is transmitted on the first power transmission path from the sun gear 21 of the planetary gear set 12 through the gear 26 to the centrifugal pendulum damper 13. Further, when the first clutch mechanism 14A is disengaged, and the second clutch mechanism 14B is engaged, the power of the input shaft 9 is transmitted on the second power transmission path through the gear 26 to the centrifugal pendulum damper 13. Furthermore, when both the first clutch mechanism 14A and the second clutch mechanism 14B are disengaged, the power of the input shaft 9 is not transmitted to the centrifugal pendulum damper 13.

FIGS. 7A and 7B are conceptual diagrams each showing operation regions of the power transmission apparatus with the centrifugal pendulum damper shown in FIG. 6. As shown in FIG. 7A, a state of the centrifugal pendulum damper mechanism 131 is switched in accordance with an engine rotating speed and an engine torque. To be specific, each of an extremely-low-rotation range where the engine rotating speed is not less than an idle rotation speed N0 and not more than N1 and a low-rotation low-load range where the engine rotating speed is not less than N1 and not more than N2 and the engine torque is not more than T1 is a speed increase usable region where the centrifugal pendulum damper 13 of the centrifugal pendulum damper mechanism 131 can be increased in speed by the planetary gear set 12.

Further, a low-rotation high-load range where the engine rotating speed is not less than N1 and not more than N2 and the engine torque is not less than T1 is a same-speed usable region where the centrifugal pendulum damper 13 of the centrifugal pendulum damper mechanism 131 can be caused to rotate at the same speed as the input shaft 9. Furthermore, a high-rotation range where the engine rotating speed is not less than N2 is a separation region where the centrifugal pendulum damper 13 of the centrifugal pendulum damper mechanism 131 can be separated from the input shaft 9.

As shown in FIG. 7B, the speed increase usable region may not be adjacent to the separation region and may be surrounded by the same-speed usable region. In this case, when the engine torque is not more than T1, and the engine rotating speed increases from N1 to N2, the region is switched to the same-speed usable region. Then, when the engine rotating speed becomes N3, the region is switched to the separation region. Therefore, unlike the example shown in FIG. 7A, while the engine rotating speed is increasing, the region is not directly switched from the speed increase usable region to the separation region. On this account, the rotating speed of the centrifugal pendulum damper 13 can be smoothly changed.

FIG. 8 is a table showing states of the engagement/disengagement mechanisms in the respective operation regions of FIG. 7. As shown in FIG. 8, in the speed increase usable region where the input shaft 9 is operated at comparatively low rotation and low load, the power transmission from the input shaft 9 to the centrifugal pendulum damper 13 on a second power transmission path b is cut off by the disengagement (OFF) of the second clutch mechanism 14B, and the power is transmitted by the engagement (ON) of the first clutch mechanism 14A from the input shaft 9 through the planetary gear set 12 to the centrifugal pendulum damper 13 on a first power transmission path a. With this, the centrifugal pendulum damper 13 is increased in speed by the planetary gear set 12.

In the same-speed usable region where the input shaft 9 is operated at comparatively low rotation and high load, the power transmission from the input shaft 9 through the planetary gear set 12 to the centrifugal pendulum damper 13 on the first power transmission path a is cut off by the disengagement of the first clutch mechanism 14A, and the power is transmitted by the engagement of the second clutch mechanism 14B from the input shaft 9 to the centrifugal pendulum damper 13 on the second power transmission path b. With this, the centrifugal pendulum damper 13 is not increased in speed by the planetary gear set 12 and is rotated at the same speed as the input shaft 9.

In the separation region where the input shaft 9 is operated at comparatively high rotation, the power transmission from the input shaft 9 to the centrifugal pendulum damper 13 on the first power transmission path a and the second power transmission path b is cut off by the disengagement of the first clutch mechanism 14A and the disengagement of the second clutch mechanism 14B. With this, the power is not transmitted to the centrifugal pendulum damper 13.

Embodiment 5

Next, a power transmission apparatus 140 with a centrifugal pendulum damper according to Embodiment 5 shown in FIG. 9 will be explained. In the following, explanations of components that are the same as those of the above embodiments are omitted, and the same reference signs are used in the drawings.

Figure 9:
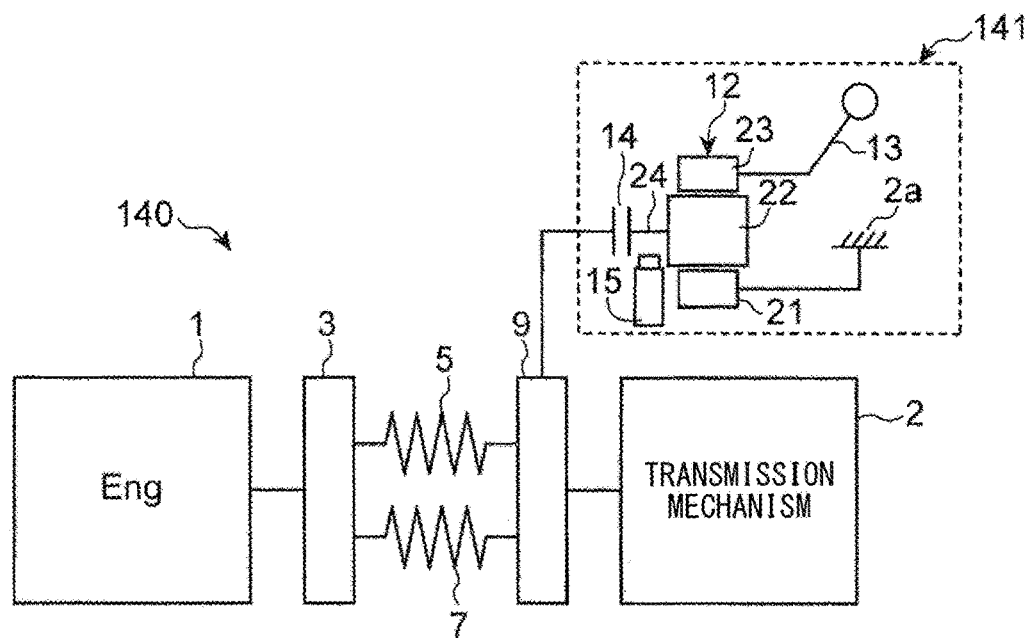
FIG. 9 is a diagram showing a vibration model of the vehicle drive system including the power transmission apparatus with the centrifugal pendulum damper according to Embodiment 5.

FIG. 9 is a diagram showing a vibration model of the vehicle drive system including the power transmission apparatus with the centrifugal pendulum damper according to Embodiment 5. As shown in FIG. 9, the power transmission apparatus 140 is different from the power transmission apparatus 10 of Embodiment 1 only regarding a centrifugal pendulum damper mechanism 141.

To be specific, the centrifugal pendulum damper mechanism 141 includes: the planetary gear set 12 that is the speed-increasing mechanism configured to increase the speed of the rotation of the input shaft 9; the centrifugal pendulum damper 13 coupled to the input shaft 9 through the planetary gear set 12; and the clutch mechanism 14 that is an engagement/disengagement mechanism capable of realizing and cutting off the power transmission from the input shaft 9 to the carrier 24 of the planetary gear set 12.

The clutch mechanism 14 is provided between the input shaft 9 and the carrier 24 of the planetary gear set 12 and connects and disconnects the input shaft 9 and the carrier 24 of the planetary gear set 12. When the clutch mechanism 14 is engaged, the power of the input shaft 9 is transmitted to the carrier 24 of the planetary gear set 12 to be transmitted to the centrifugal pendulum damper 13 coupled to the ring gear 23 that meshes with the pinion 22. In contrast, when the clutch mechanism 14 is disengaged, the power of the input shaft 9 is not transmitted to the planetary gear set 12 and the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 12 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 12 exceeds the predetermined value, the clutch mechanism 14 is disengaged. During this time, the power is not transmitted from the input shaft 9 of the transmission mechanism 2 through the planetary gear set 12 to the centrifugal pendulum damper 13. After that, the clutch mechanism 14 is engaged or disengaged in accordance with the rotating speed of the centrifugal pendulum damper 13.

Figure 10:
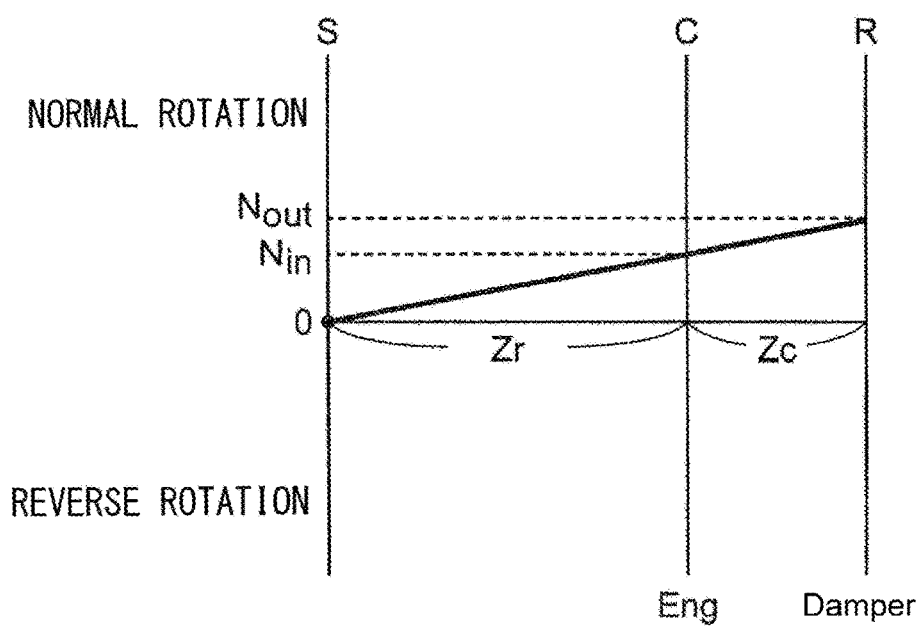
FIG. 10 is a speed diagram of the speed-increasing mechanism of the power transmission apparatus with the centrifugal pendulum damper shown in FIG. 9.

FIG. 10 is a speed diagram of the planetary gear set 12 that is the speed-increasing mechanism of the power transmission apparatus 140 shown in FIG. 9. As shown in FIG. 10, since the sun gear 21 is being fixed, the rotation input from the input shaft 9 to the carrier 24 is changed in speed based on Zr:Zc that is a gear ratio of the ring gear 23 and the carrier 24, and the rotation is then output through the ring gear 23. At this time, the ring gear 23 rotates in the same rotational direction as the carrier 24 (normal rotation), so that a relation "Nout=Nin×(Zr+Zc)/Zr" is satisfied, where Nin denotes an input rotation speed of the carrier 24, and Nout denotes an output rotation speed of the ring gear 23. Therefore, needless to say, the output rotation speed Nout becomes higher than the input rotation speed Nin. Thus, the rotation input from the input shaft 9 is increased in speed by the planetary gear set 12 to be transmitted to the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 12 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 12 exceeds the predetermined value, the clutch mechanism 14 is disengaged. During this time, the power is not transmitted from the input shaft 9 of the transmission mechanism 2 through the planetary gear set 12 to the centrifugal pendulum damper 13. After that, the clutch mechanism 14 is engaged or disengaged in accordance with the rotating speed of the centrifugal pendulum damper 13.

The present embodiment is effective when it is unnecessary to increase a speed increasing ratio of the planetary gear set 12.

Embodiment 6

Next, a power transmission apparatus 150 with a centrifugal pendulum damper according to Embodiment 6 shown in FIG. 11 will be explained. In the following, explanations of components that are the same as those of the above embodiments are omitted, and the same reference signs are used in the drawings.

Figure 11:
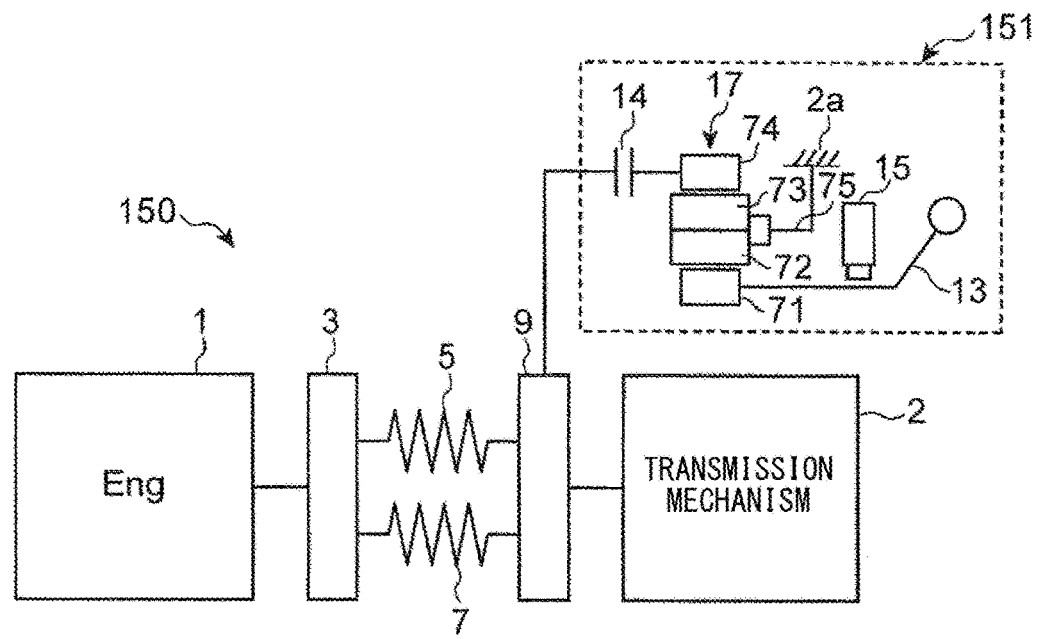
FIG. 11 is a diagram showing a vibration model of the vehicle drive system including the power transmission apparatus with the centrifugal pendulum damper according to Embodiment 6.

FIG. 11 is a diagram showing a vibration model of the vehicle drive system including the power transmission apparatus with the centrifugal pendulum damper according to Embodiment 6. As shown in FIG. 11, the power transmission apparatus 150 is different from the power transmission apparatus 10 of Embodiment 1 only regarding a centrifugal pendulum damper mechanism 151.

To be specific, the centrifugal pendulum damper mechanism 151 includes: a double pinion type planetary gear set 17 that is the speed-increasing mechanism configured to increase the speed of the rotation of the input shaft 9; the centrifugal pendulum damper 13 coupled to the input shaft 9 through the planetary gear set 17; and the clutch mechanism 14 that is an engagement/disengagement mechanism capable of realizing and cutting off the power transmission from the input shaft 9 to the centrifugal pendulum damper 13.

The planetary gear set 17 includes, as rotational elements, a sun gear 71, a ring gear 74, and a pinion carrier 75 (hereinafter simply abbreviated as a "carrier 75") supporting a first pinion 72 and a second pinion 73, the first pinion 72 meshing with the sun gear 71, the second pinion 73 meshing with the first pinion 72 and the ring gear 74. In the present embodiment, the ring gear 74 is coupled to the input shaft 9 through the clutch mechanism 14, the carrier 75 is coupled to the first casing member 2a, and the sun gear 71 is coupled to the centrifugal pendulum damper 13.

The clutch mechanism 14 is provided between the input shaft 9 and the ring gear 74 of the planetary gear set 17 and connects and disconnects the input shaft 9 and the ring gear 74 of the planetary gear set 17. When the clutch mechanism 14 is engaged, the power of the input shaft 9 is transmitted to the ring gear 74 of the planetary gear set 17 to be transmitted to the centrifugal pendulum damper 13 coupled to the sun gear 71 that meshes with the pinions 72 and 73. In contrast, when the clutch mechanism 14 is disengaged, the power of the input shaft 9 is not transmitted to the planetary gear set 17 and the centrifugal pendulum damper 13.

Figure 12:
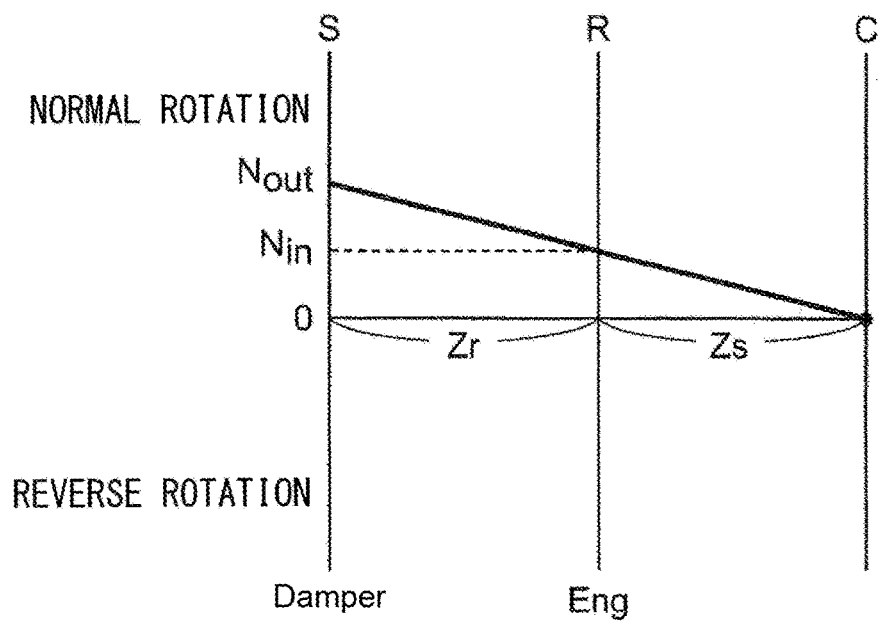
FIG. 12 is a speed diagram of the speed-increasing mechanism of the power transmission apparatus with the centrifugal pendulum damper shown in FIG. 11.

FIG. 12 is a speed diagram of the planetary gear set 17 that is the speed-increasing mechanism of the power transmission apparatus 150 shown in FIG. 11. As shown in FIG. 12, since the carrier 75 is being fixed, the rotation input from the input shaft 9 to the ring gear 74 is changed in speed based on Zr:Zs that is a gear ratio of the ring gear 74 and the sun gear 71, and the rotation is then output through the sun gear 71. At this time, the sun gear 71 rotates in the same rotational direction as the ring gear 74 (normal rotation), so that a relation "Nout=Nin×(Zr+Zs)/Zs" is satisfied, where Nin denotes an input rotation speed of the ring gear 74, and Nout denotes an output rotation speed of the sun gear 71. Therefore, needless to say, the output rotation speed Nout becomes higher than the input rotation speed Nin. Thus, the rotation input from the input shaft 9 is increased in speed by the planetary gear set 17 to be transmitted to the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 17 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 17 exceeds the predetermined value, the clutch mechanism 14 is disengaged. During this time, the power is not transmitted from the input shaft of the transmission mechanism 2 to the planetary gear set 17 and the centrifugal pendulum damper 13. After that, the clutch mechanism 14 is engaged or disengaged in accordance with the rotating speed of the centrifugal pendulum damper 13.

Embodiment 7

Next, a power transmission apparatus 160 with a centrifugal pendulum damper according to Embodiment 7 shown in FIG. 13 will be explained. In the following, explanations of components that are the same as those of the above embodiments are omitted, and the same reference signs are used in the drawings.

Figure 13:
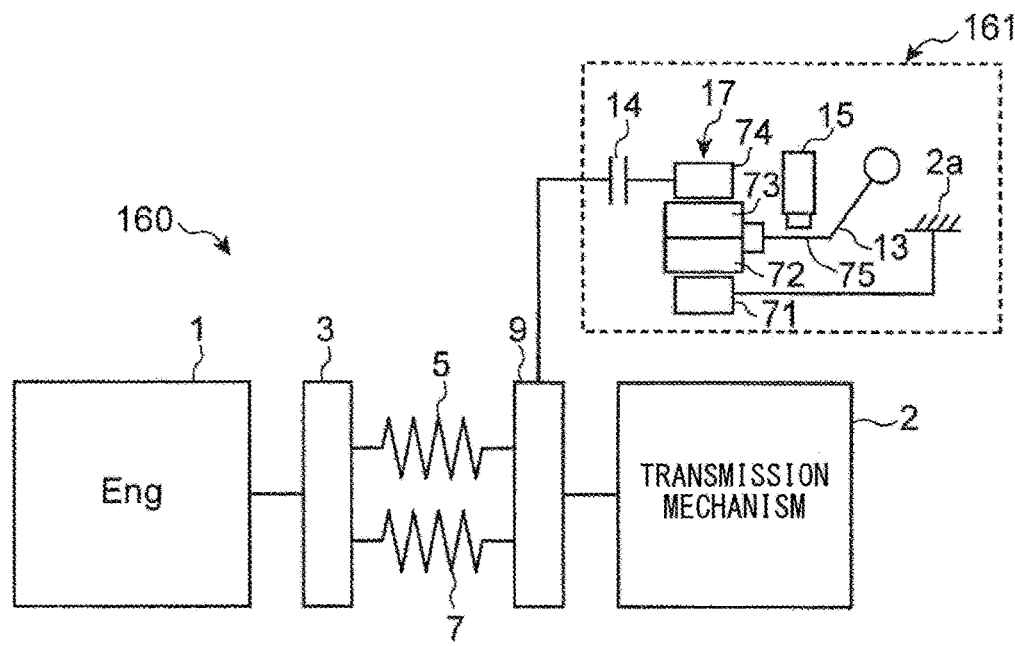
FIG. 13 is a diagram showing a vibration model of the vehicle drive system including the power transmission apparatus with the centrifugal pendulum damper according to Embodiment 7.

FIG. 13 is a diagram showing a vibration model of the vehicle drive system including the power transmission apparatus with the centrifugal pendulum damper according to Embodiment 7. As shown in FIG. 13, the power transmission apparatus 160 is different from the power transmission apparatus 10 of Embodiment 1 only regarding a centrifugal pendulum damper mechanism 161.

To be specific, the centrifugal pendulum damper mechanism 161 includes: the double pinion type planetary gear set 17 that is the speed-increasing mechanism configured to increase the speed of the rotation of the input shaft 9; the centrifugal pendulum damper 13 coupled to the input shaft 9 through the planetary gear set 17; and the clutch mechanism 14 that is an engagement/disengagement mechanism capable of realizing and cutting off the power transmission from the input shaft 9 to the centrifugal pendulum damper 13. In the present embodiment, the ring gear 74 of the planetary gear set 17 is coupled to the input shaft 9 through the clutch mechanism 14, the carrier 75 is coupled to the centrifugal pendulum damper 13, and the sun gear 71 is coupled to the first casing member 2a.

Figure 14:
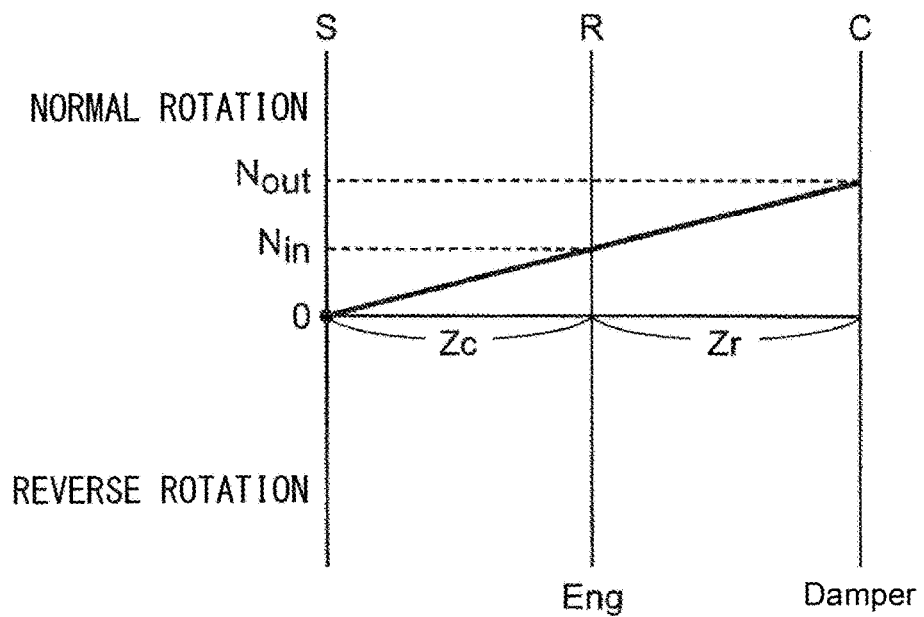
FIG. 14 is a speed diagram of the speed-increasing mechanism of the power transmission apparatus with the centrifugal pendulum damper shown in FIG. 13.

FIG. 14 is a speed diagram of the planetary gear set 17 that is the speed-increasing mechanism of the power transmission apparatus 160 shown in FIG. 13. As shown in FIG. 14, since the sun gear 71 is being fixed, the rotation input from the input shaft 9 to the ring gear 74 is changed in speed based on Zr:Zc that is a gear ratio of the ring gear 74 and the carrier 75, and the rotation is then output through the carrier 75. At this time, the carrier 75 rotates in the same rotational direction as the ring gear 74 (normal rotation), so that a relation "Nout=Nin×(Zr+Zc)/Zc" is satisfied, where Nin denotes an input rotation speed of the ring gear 74, and Nout denotes an output rotation speed of the carrier 75. Therefore, needless to say, the output rotation speed Nout becomes higher than the input rotation speed Nin. Thus, the rotation input from the input shaft 9 is increased in speed by the planetary gear set 17 to be transmitted to the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 17 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 17 exceeds the predetermined value, the clutch mechanism 14 is disengaged. During this time, the power is not transmitted from the input shaft of the transmission mechanism 2 to the planetary gear set 17 and the centrifugal pendulum damper 13. After that, the clutch mechanism 14 is engaged or disengaged in accordance with the rotating speed of the centrifugal pendulum damper 13.

Embodiment 8

Next, a power transmission apparatus 170 with a centrifugal pendulum damper according to Embodiment 8 shown in FIG. 15 will be explained. In the following, explanations of components that are the same as those of the above embodiments are omitted, and the same reference signs are used in the drawings.

Figure 15:
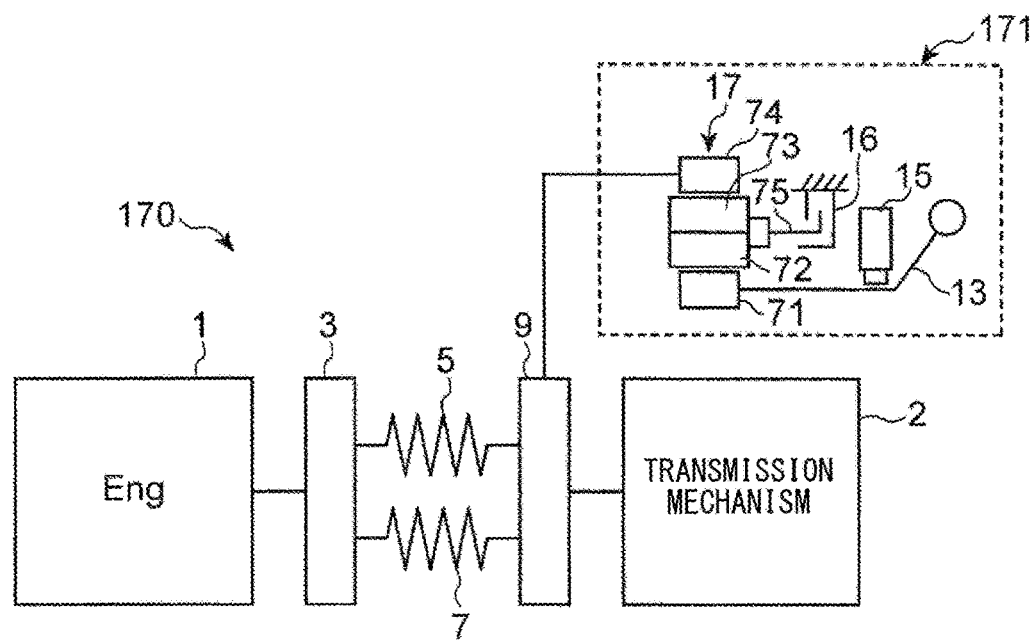
FIG. 15 is a diagram showing a vibration model of the vehicle drive system including the power transmission apparatus with the centrifugal pendulum damper according to Embodiment 8.

FIG. 15 is a diagram showing a vibration model of the vehicle drive system including the power transmission apparatus with the centrifugal pendulum damper according to Embodiment 8. As shown in FIG. 15, the power transmission apparatus 170 is different from the power transmission apparatus 10 of Embodiment 1 only regarding a centrifugal pendulum damper mechanism 171.

To be specific, the centrifugal pendulum damper mechanism 171 includes: the double pinion type planetary gear set 17 that is the speed-increasing mechanism configured to increase the speed of the rotation of the input shaft 9; the centrifugal pendulum damper 13 coupled to the input shaft 9 through the planetary gear set 17; and the brake mechanism 16 that is an engagement/disengagement mechanism capable of realizing and cutting off the power transmission from the input shaft 9 to the centrifugal pendulum damper 13. In the present embodiment, the ring gear 74 of the planetary gear set 17 is coupled to the input shaft 9, the carrier 75 is coupled to the brake mechanism 16, and the sun gear 71 is coupled to the centrifugal pendulum damper 13.

Figure 16:
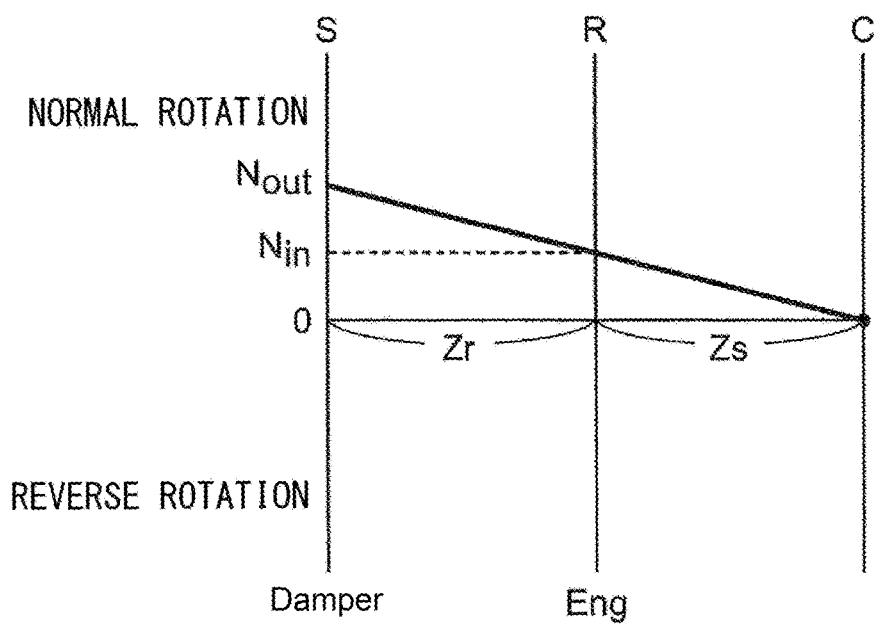
FIG. 16 is a speed diagram of the speed-increasing mechanism of the power transmission apparatus with the centrifugal pendulum damper shown in FIG. 15.

FIG. 16 is a speed diagram of the planetary gear set 17 that is the speed-increasing mechanism of the power transmission apparatus 170 shown in FIG. 15. As shown in FIG. 16, when the carrier 75 is being fixed, the rotation input from the input shaft 9 to the ring gear 74 is changed in speed based on Zr:Zs that is a gear ratio of the ring gear 74 and the sun gear 71, and the rotation is then output through the sun gear 71. At this time, the sun gear 71 rotates in the same rotational direction as the ring gear 74 (normal rotation), so that a relation "Nout=Nin×(Zr+Zs)/Zs" is satisfied, where Nin denotes an input rotation speed of the ring gear 74, and Nout denotes an output rotation speed of the sun gear 71. Therefore, needless to say, the output rotation speed Nout becomes higher than the input rotation speed Nin. Thus, the rotation input from the input shaft 9 is increased in speed by the planetary gear set 17 to be transmitted to the centrifugal pendulum damper 13.

According to the present embodiment, when the engine 1 is started up, and the rotating speed of the centrifugal pendulum damper 13 is the predetermined value or less, the brake mechanism 16 is engaged, so that the power is transmitted from the input shaft 9 of the transmission mechanism 2 through the planetary gear set 17 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 17 exceeds the predetermined value, the brake mechanism 16 is disengaged. During this time, the power is not transmitted from the input shaft of the transmission mechanism 2 through the planetary gear set 17 to the centrifugal pendulum damper 13. After that, the brake mechanism 16 is engaged or disengaged in accordance with the rotating speed of the centrifugal pendulum damper 13.

Embodiment 9

Next, a power transmission apparatus 180 with a centrifugal pendulum damper according to Embodiment 9 shown in FIG. 17 will be explained. In the following, explanations of components that are the same as those of the above embodiments are omitted, and the same reference signs are used in the drawings.

Figure 17:
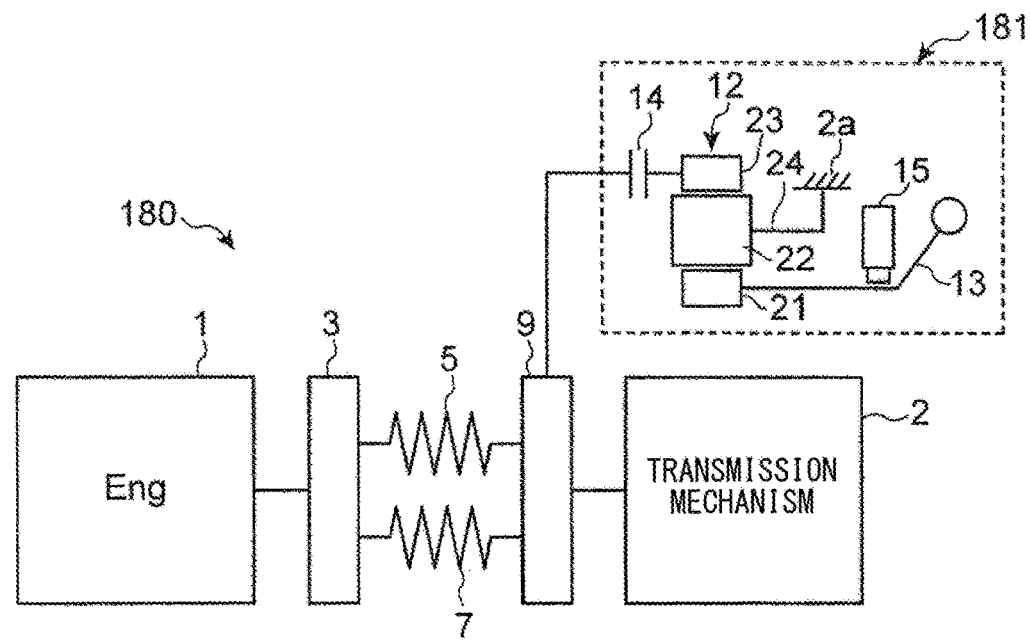
FIG. 17 is a diagram showing a vibration model of the vehicle drive system including the power transmission apparatus with the centrifugal pendulum damper according to Embodiment 9.

FIG. 17 is a diagram showing a vibration model of the vehicle drive system including the power transmission apparatus with the centrifugal pendulum damper according to Embodiment 9. As shown in FIG. 17, the power transmission apparatus 180 is different from the power transmission apparatus 10 of Embodiment 1 only regarding a centrifugal pendulum damper mechanism 181.

To be specific, the centrifugal pendulum damper mechanism 181 includes: the planetary gear set 12 that is the speed-increasing mechanism configured to increase the speed of the rotation of the input shaft 9; the centrifugal pendulum damper 13 coupled to the input shaft 9 through the planetary gear set 12; and the clutch mechanism 14 that is an engagement/disengagement mechanism capable of realizing and cutting off the power transmission from the input shaft 9 to the centrifugal pendulum damper 13.

The clutch mechanism 14 is provided between the input shaft 9 and the ring gear 23 of the planetary gear set 12 and connects and disconnects the input shaft 9 and the ring gear 23 of the planetary gear set 12. When the clutch mechanism 14 is engaged, the power of the input shaft 9 is transmitted through the planetary gear set 12 to the centrifugal pendulum damper 13. In contrast, when the clutch mechanism 14 is disengaged, the power of the input shaft 9 is not transmitted to the centrifugal pendulum damper 13.

Figure 18:
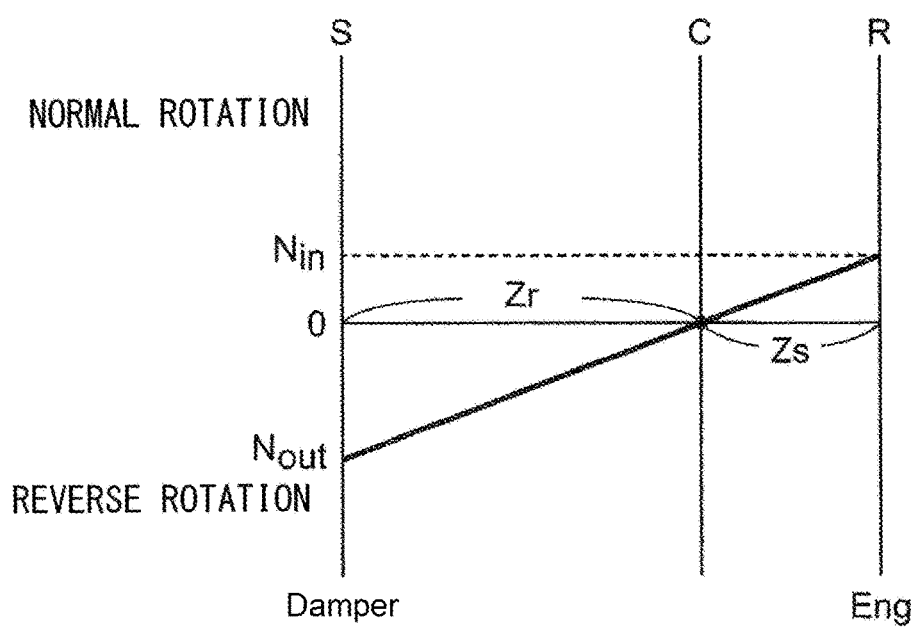
FIG. 18 is a speed diagram of the speed-increasing mechanism of the power transmission apparatus with the centrifugal pendulum damper shown in FIG. 17.

FIG. 18 is a speed diagram of the planetary gear set 12 that is the speed-increasing mechanism of the power transmission apparatus 180 shown in FIG. 17. As shown in FIG. 18, since the carrier 24 is being fixed, the rotation input from the input shaft 9 to the ring gear 23 is changed in speed based on Zr:Zs that is a gear ratio of the ring gear 23 and the sun gear 21, and the rotation is then output through the sun gear 21. At this time, the ring gear 23 rotates in a rotational direction opposite to the rotational direction of the sun gear 21 (reverse rotation), so that a relation "Nout=Nin×Zr/Zs" is satisfied, where Nin denotes an input rotation speed of the ring gear 23, and Nout denotes an output rotation speed of the sun gear 21. Since a magnitude relation between the number of teeth of the ring gear 23 and the number of teeth of the sun gear 21 is Zr>Zs, the output rotation speed Nout becomes higher than the input rotation speed Nin. Thus, the rotation input from the input shaft 9 is increased in speed by the planetary gear set 12 to be transmitted to the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the planetary gear set 12 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the planetary gear set 12 exceeds the predetermined value, the clutch mechanism 14 is disengaged. During this time, the power is not transmitted from the input shaft 9 of the transmission mechanism 2 through the planetary gear set 12 to the centrifugal pendulum damper 13. After that, the clutch mechanism 14 is engaged or disengaged in accordance with the rotating speed of the centrifugal pendulum damper 13.

In the present embodiment, since the carrier 24 of the planetary gear set 12 is being fixed, the sun gear 21 rotates in the opposite direction to the ring gear 23. Further, the present embodiment is effective when it is unnecessary to increase the speed increasing ratio of the planetary gear set 12.

The centrifugal pendulum damper mechanism 181 may be configured such that: in the planetary gear set 17, the magnitude relation between the number of teeth of the ring gear 23 and the number of teeth of the sun gear 21 is Zr<Zs; the sun gear 21 is coupled to the input shaft 9 through the clutch mechanism 14; and the ring gear 23 is coupled to the centrifugal pendulum damper 13.

Embodiment 10

Next, a power transmission apparatus 190 with a centrifugal pendulum damper according to Embodiment 10 shown in FIG. 19 will be explained. In the following, explanations of components that are the same as those of the above embodiments are omitted, and the same reference signs are used in the drawings.

Figure 19:
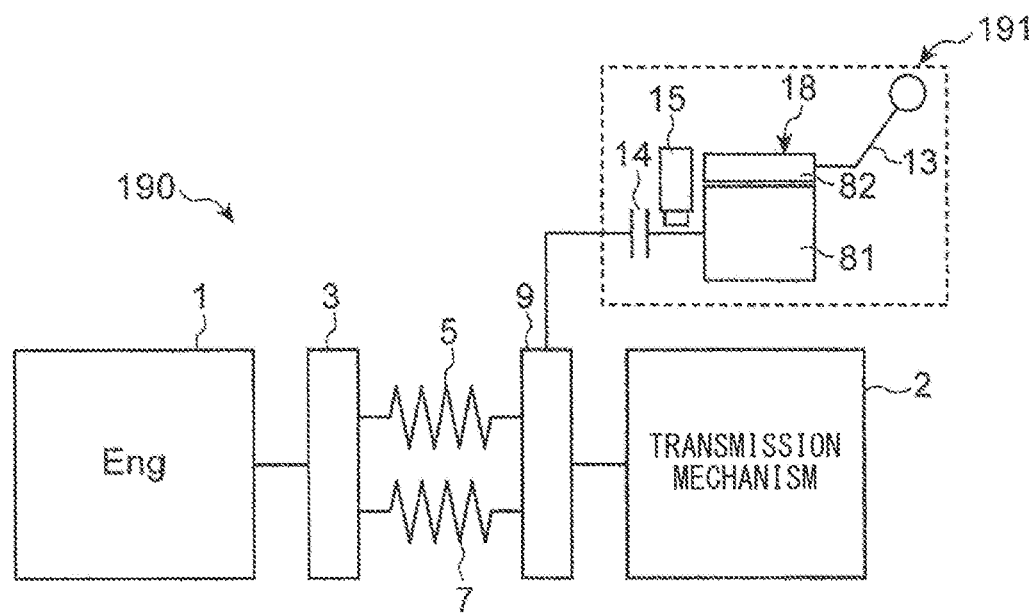
FIG. 19 is a diagram showing a vibration model of the vehicle drive system including the power transmission apparatus with the centrifugal pendulum damper according to Embodiment 10.

FIG. 19 is a diagram showing a vibration model of the vehicle drive system including the power transmission apparatus with the centrifugal pendulum damper according to Embodiment 10. As shown in FIG. 19, the power transmission apparatus 190 is different from the power transmission apparatus 10 of Embodiment 1 only regarding a centrifugal pendulum damper mechanism 191.

To be specific, the centrifugal pendulum damper mechanism 191 includes: a gear train 18 that is the speed-increasing mechanism configured to increase the speed of the rotation of the input shaft 9; the centrifugal pendulum damper 13 coupled to the input shaft 9 through the gear train 18; and the clutch mechanism 14 that is an engagement/disengagement mechanism capable of realizing and cutting off the power transmission from the input shaft 9 to the centrifugal pendulum damper 13.

The gear train 18 includes, as rotational elements, a large gear 81 and a small gear 82 that meshes with the large gear 81. The number of teeth of the large gear 81 is set to be larger than the number of teeth of the small gear 82. The large gear 81 is coupled to the input shaft 9 through the clutch mechanism 14, and the small gear 82 is coupled to the centrifugal pendulum damper 13.

The clutch mechanism 14 is provided between the input shaft 9 and the large gear 81 of the gear train 18 and connects and disconnects the input shaft 9 and the large gear 81 of the gear train 18. When the clutch mechanism 14 is engaged, the power of the input shaft 9 is transmitted from the large gear 81 of the gear train 18 through the small gear 82 to the centrifugal pendulum damper 13. In contrast, when the clutch mechanism 14 is disengaged, the power of the input shaft 9 is not transmitted to the gear train 18 and the centrifugal pendulum damper 13.

In the present embodiment, when the engine 1 is started up, and the rotating speed of the centrifugal pendulum damper 13 is the predetermined value or less, the clutch mechanism 14 is engaged, so that the power is transmitted from the input shaft 9 of the transmission mechanism 2 through the gear train 18 to the centrifugal pendulum damper 13. During this time, the torque fluctuation generated at the engine 1 is absorbed by the centrifugal pendulum damper 13.

When the rotation of the engine 1 increases, and the rotating speed of the centrifugal pendulum damper 13 increased by the gear train 18 exceeds the predetermined value, the clutch mechanism 14 is disengaged. During this time, the power is not transmitted from the input shaft 9 of the transmission mechanism 2 through the gear train 18 to the centrifugal pendulum damper 13. After that, the clutch mechanism 14 is engaged or disengaged in accordance with the rotating speed of the centrifugal pendulum damper 13.

As above, according to Embodiments 1 to 10, the clutch mechanism 14 or the brake mechanism 16 is included as the engagement/disengagement mechanism capable of realizing and cutting off the power transmission from the input shaft 9 to the centrifugal pendulum damper 13. Since the power transmission from the input shaft 9 to the centrifugal pendulum damper 13 is cut off by the engagement/disengagement mechanism under a circumstance where the input shaft 9 is operated at comparatively high rotation, the centrifugal pendulum damper 13 can be prevented from being increased in speed by the planetary gear set 12. Therefore, the centrifugal pendulum damper 13 does not have to have a structure that can endure the centrifugal force during the high-speed rotation for the purpose of securing the reliability of the centrifugal pendulum damper 13. Thus, the reliability of the centrifugal pendulum damper 13 can be secured while preventing the size increase of the centrifugal pendulum damper 13.

Further, in the low-rotation range where the torque fluctuation is large, the clutch mechanism 14 or the brake mechanism 16 is engaged, and with this, the torque fluctuation can be absorbed by the centrifugal pendulum damper 13.

Therefore, according to the present invention, the torque fluctuation and the vibration noise of the vehicle are effectively suppressed while avoiding the size increase of the centrifugal pendulum damper 13 and the deterioration of the reliability of the centrifugal pendulum damper 13 by the high-speed rotation.

According to Embodiments 1, 4 to 7, 9, and 10, the clutch mechanism 14 or the brake mechanism 16 is provided so as to be capable of realizing and cutting off the power transmission from the input shaft 9 to the planetary gear set 12. Since the power transmission from the input shaft 9 to the planetary gear set 12 is cut off by the clutch mechanism 14 or the brake mechanism 16 under a circumstance where the input shaft 9 is operated at comparatively high rotation, the planetary gear set 12 can be prevented from being driven. Thus, power loss caused by driving the planetary gear set 12 can be reduced.

According to Embodiment 4, the engagement/disengagement mechanism includes the first clutch mechanism 14A and the second clutch mechanism 14B. The first clutch mechanism 14A and the planetary gear set 12 are interposed on the first power transmission path extending between the input shaft 9 and the centrifugal pendulum damper 13, and the second clutch mechanism 14B is interposed on the second power transmission path formed independently from the first power transmission path and extending between the input shaft 9 and the centrifugal pendulum damper 13. Since the power transmission from the input shaft 9 to the centrifugal pendulum damper 13 on the first power transmission path and the second power transmission path is cut off by the first clutch mechanism 14A and the second clutch mechanism 14B under a circumstance where the input shaft 9 is operated at comparatively high rotation, the power can be prevented from being transmitted to the centrifugal pendulum damper 13.

Further, under a circumstance where the input shaft 9 is operated at comparatively low rotation and high load, the power transmission from the input shaft 9 through the planetary gear set 12 to the centrifugal pendulum damper 13 on the first power transmission path is cut off by the first clutch mechanism 14A, and the power is transmitted by the second clutch mechanism 14B from the input shaft 9 to the centrifugal pendulum damper 13 on the second power transmission path. With this, the centrifugal pendulum damper 13 is not increased in speed by the planetary gear set 12 and can be rotated at the same speed as the input shaft 9.

Further, under a circumstance where the input shaft 9 is operated at comparatively low rotation and low load, the power transmission from the input shaft 9 to the centrifugal pendulum damper 13 on the second power transmission path is cut off by the second clutch mechanism 14B, and the power is transmitted by the first clutch mechanism 14A from the input shaft 9 through the planetary gear set 12 to the centrifugal pendulum damper 13 on the first power transmission path. With this, the centrifugal pendulum damper 13 can be increased in speed by the planetary gear set 12.

Therefore, by controlling the engagement and disengagement of the first clutch mechanism 14A and the second clutch mechanism 14B, the centrifugal pendulum damper 13 can be switched to a speed-increasing state, a same-speed state, or a cut-off state. Thus, appropriate control can be performed in accordance with an operation state of the vehicle.

According to Embodiments 1 to 5 and 9, the planetary gear set 12 is the single pinion type planetary gear set including the sun gear 21, the pinion the carrier 24, and the ring gear 23, and the carrier 24 is coupled to the input shaft 9. Further, one of the sun gear 21 and the ring gear 23 is coupled to the centrifugal pendulum damper 13, and the other of the sun gear 21 and the ring gear 23 is coupled to a restraining unit configured to restrain the rotation of the other of the sun gear 21 and the ring gear 23. Therefore, the configuration of the power transmission apparatus with the centrifugal pendulum damper is embodied, and the above effects are realized by the embodied power transmission apparatus with the centrifugal pendulum damper.

On the other hand, according to Embodiments 6 to 8, the planetary gear set 12 is the double pinion type planetary gear set including the sun gear 21, the pinion the carrier 24, and the ring gear 23, and the ring gear 23 is coupled to the input shaft 9. Further, one of the sun gear 21 and the carrier 24 is coupled to the centrifugal pendulum damper 13, and the other of the sun gear 21 and the carrier 24 is coupled to the restraining unit configured to restrain the rotation of the other of the sun gear 21 and the carrier 24. Therefore, the configuration of the power transmission apparatus with the centrifugal pendulum damper is embodied, and the above effects are realized by the embodied power transmission apparatus with the centrifugal pendulum damper.

According to Embodiments 2 and 8, the planetary gear set 12 is the planetary gear set including the sun gear 21, the carrier 24 supporting the pinion 22, and the ring gear 23, and the engagement/disengagement mechanism is the brake mechanism 16 capable of braking the rotation of any one of the sun gear 21, carrier 24, and ring gear 23 of the planetary gear set 12. Typically, the brake mechanism 16 is not affected by centrifugal hydraulic pressure unlike the clutch mechanism 14. Therefore, control accuracy of the engagement/disengagement mechanism can be improved by using the brake mechanism 16 as the engagement/disengagement mechanism.

According to Embodiments 1 to 10, the engagement/disengagement mechanism suppresses excessive rotation of the centrifugal pendulum damper 13. Since the power transmission from the input shaft 9 to the centrifugal pendulum damper 13 is cut off by the engagement/disengagement mechanism, the centrifugal pendulum damper 13 can be prevented from being increased in speed by the planetary gear set 12. Therefore, the centrifugal pendulum damper 13 does not have to have a structure that can endure the centrifugal force during the high-speed rotation for the purpose of securing the reliability of the centrifugal pendulum damper 13. Thus, the reliability of the centrifugal pendulum damper 13 can be secured while preventing the size increase of the centrifugal pendulum damper 13.

According to Embodiments 1 to 10, the clutch mechanism 14 or the brake mechanism 16 is included as the engagement/disengagement mechanism configured to suppress the excessive rotation of the centrifugal pendulum damper 13 and capable of realizing and cutting off the power transmission from the input shaft 9 to the centrifugal pendulum damper 13. Therefore, under a circumstance where the input shaft 9 is operated at comparatively high rotation, the power transmission to the centrifugal pendulum damper 13 can be cut off by the engagement/disengagement mechanism such that the excessive rotation of the centrifugal pendulum damper 13 is prevented. On this account, the centrifugal pendulum damper 13 does not have to have a structure that can endure the centrifugal force during the high-speed rotation for the purpose of securing the reliability of the centrifugal pendulum damper 13. Thus, the reliability of the centrifugal pendulum damper 13 can be secured while preventing the size increase of the centrifugal pendulum damper 13.

According to Embodiment 1, the clutch mechanism 14 is included as the engagement/disengagement mechanism capable of realizing and cutting off the power transmission from the input shaft 9 to the centrifugal pendulum damper 13, and the single pinion type planetary gear set 12 including the sun gear 21, the pinion the carrier 24, and the ring gear is interposed on the power transmission path extending between the engagement/disengagement mechanism and the centrifugal pendulum damper 13. Further, the carrier 24 is coupled to the engagement/disengagement mechanism, the ring gear 23 is fixed to the first casing member 2a, and the sun gear 21 is coupled to the centrifugal pendulum damper 13. Therefore, when the power is transmitted from the input shaft 9 to the carrier 24 by the engagement/disengagement mechanism under a circumstance where the input shaft 9 is operated at comparatively low rotation, the rotation of the centrifugal pendulum damper 13 is increased in speed together with the rotation of the sun gear 21. In contrast, when the power transmission to the carrier 24 is cut off by the engagement/disengagement mechanism under a circumstance where the input shaft 9 is operated at comparatively high rotation, the power is not transmitted to the centrifugal pendulum damper 13 coupled to the sun gear 21. Therefore, the centrifugal pendulum damper 13 does not have to have a structure that can endure the centrifugal force during the high-speed rotation for the purpose of securing the reliability of the centrifugal pendulum damper 13. Thus, the torque fluctuation and the vibration noise of the vehicle can be effectively suppressed while avoiding the size increase of the centrifugal pendulum damper and the deterioration of the reliability of the centrifugal pendulum damper by the high-speed rotation.

The present invention is not limited to the above explained embodiments, and various modifications and design changes may be made within the scope of the present invention.

Figure 20:
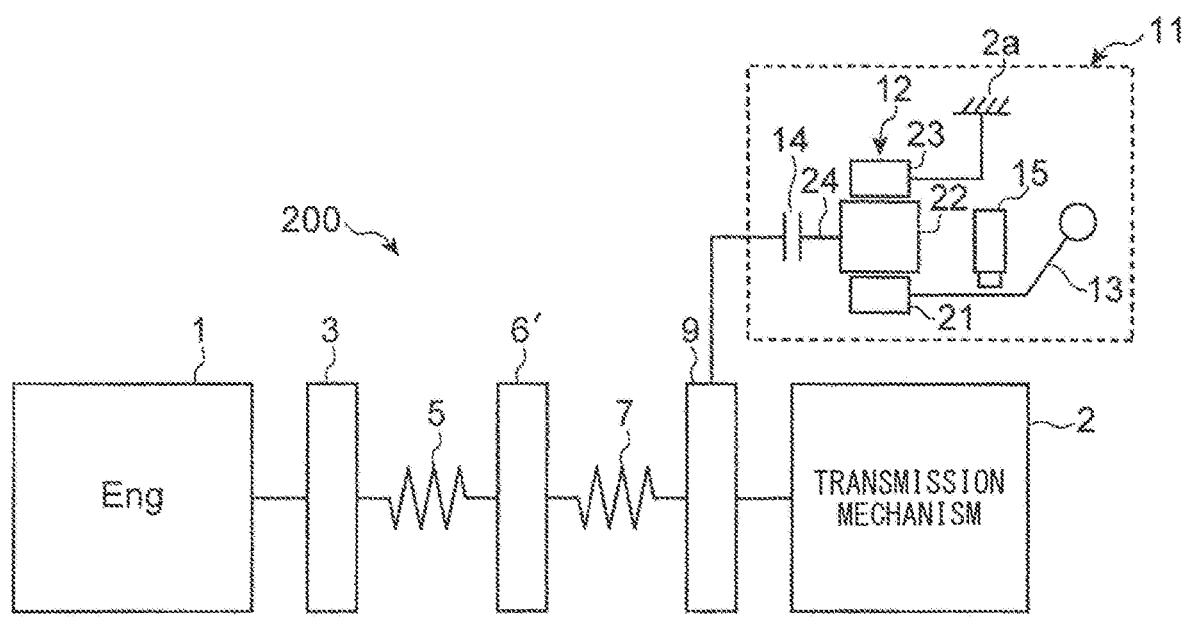
FIG. 20 is a diagram showing a vibration model of the vehicle drive system including the power transmission apparatus with the centrifugal pendulum damper according to another embodiment.

The above embodiment has explained an example where the torsional damper mechanism coupling the output shaft 3 and the input shaft 9 includes the first coil spring 5 and the second coil spring 7 which are coupled to the output shaft 3 and the input shaft 9 so as to be provided in parallel. However, as shown in FIG. 20, the torsional damper mechanism may be configured such that the first coil spring 5 and the second coil spring 7 are coupled to each other in series through an intermediate plate 6'. In this case, if coil springs having different vibration characteristics are used as the first coil spring 5 and the second coil spring 7, the first coil spring 5 and the second coil spring 7 can absorb the torque fluctuation of different characteristics. At this time, the centrifugal pendulum damper mechanism may be any of the centrifugal pendulum damper mechanisms 11 to 191 of Embodiments 1 to 10.

Figure 21A:
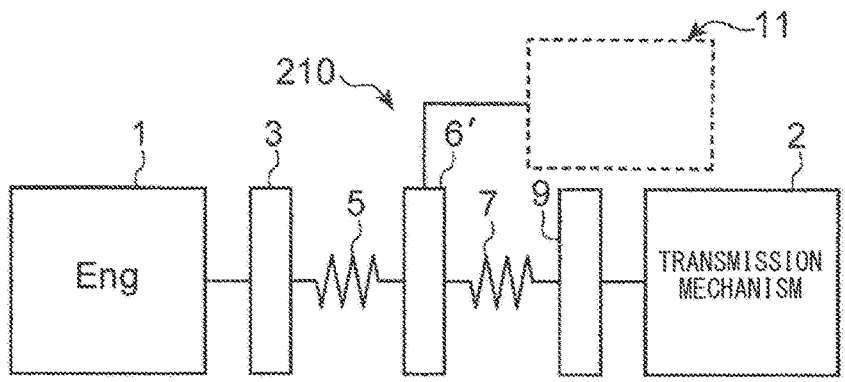
FIGS. 21A to 21D are diagrams showing vibration models of the vehicle drive systems including the power transmission apparatuses with the centrifugal pendulum dampers according to other embodiments.
Figure 21B:
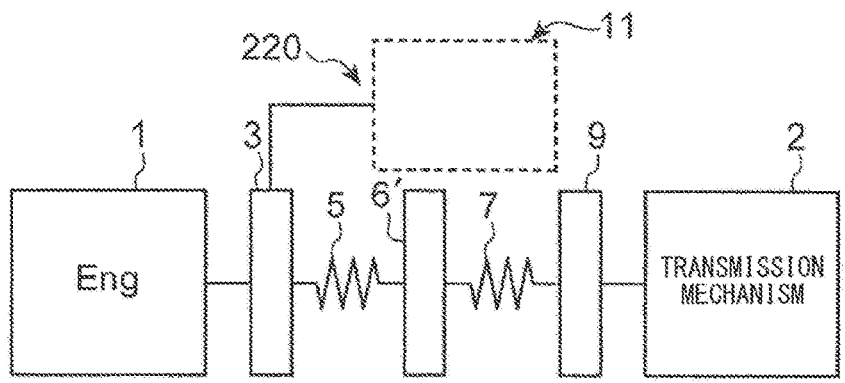

The above embodiment has explained a case where the centrifugal pendulum damper mechanism 11 is coupled to the input shaft 9 of the transmission mechanism 2. However, the centrifugal pendulum damper mechanism 11 may be coupled to the output shaft 3 of the engine 1. Further, when using the torsional damper mechanism shown in FIG. 20, the centrifugal pendulum damper mechanism 11 may be coupled to the output shaft 3 of the engine 1 or the intermediate plate 6' as shown in FIGS. 21A and 21B. At this time, the centrifugal pendulum damper mechanism may be any of the centrifugal pendulum damper mechanisms 11 to 191 of Embodiments 1 to 10.

Figure 21C:
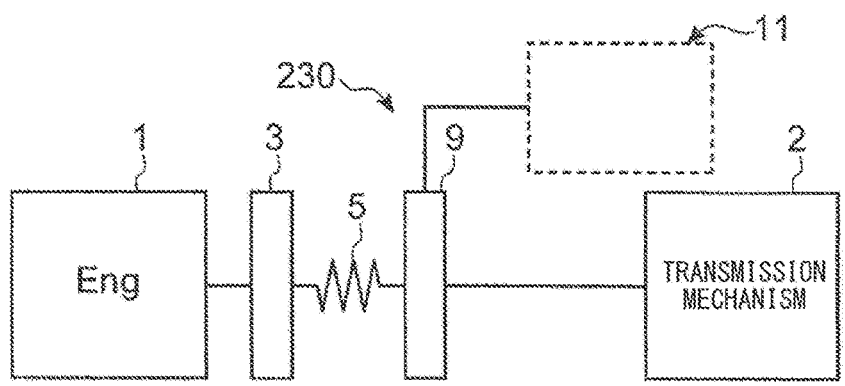
Figure 21D:
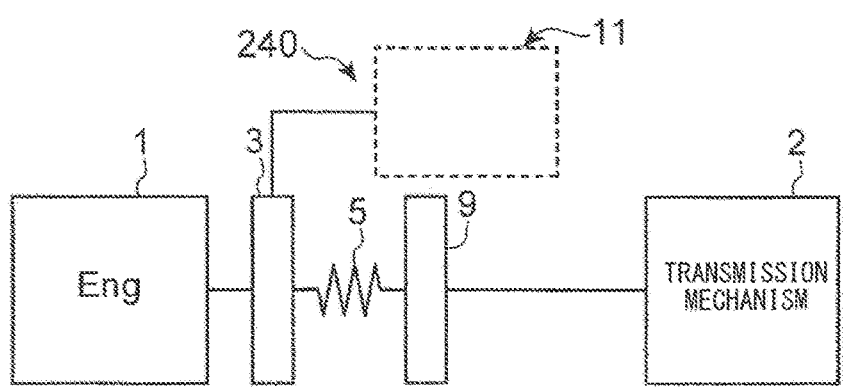

The above embodiment has explained a case where the spring damper mechanism is constituted by the first coil spring 5 and the second coil spring 7. However, as shown in FIGS. 21C and 21D, the output shaft 3 and the input shaft 9 may be coupled to each other only by the first coil spring 5. At this time, the centrifugal pendulum damper mechanism may be any of the centrifugal pendulum damper mechanisms 11 to 191 of Embodiments 1 to 10.

Figure 22:
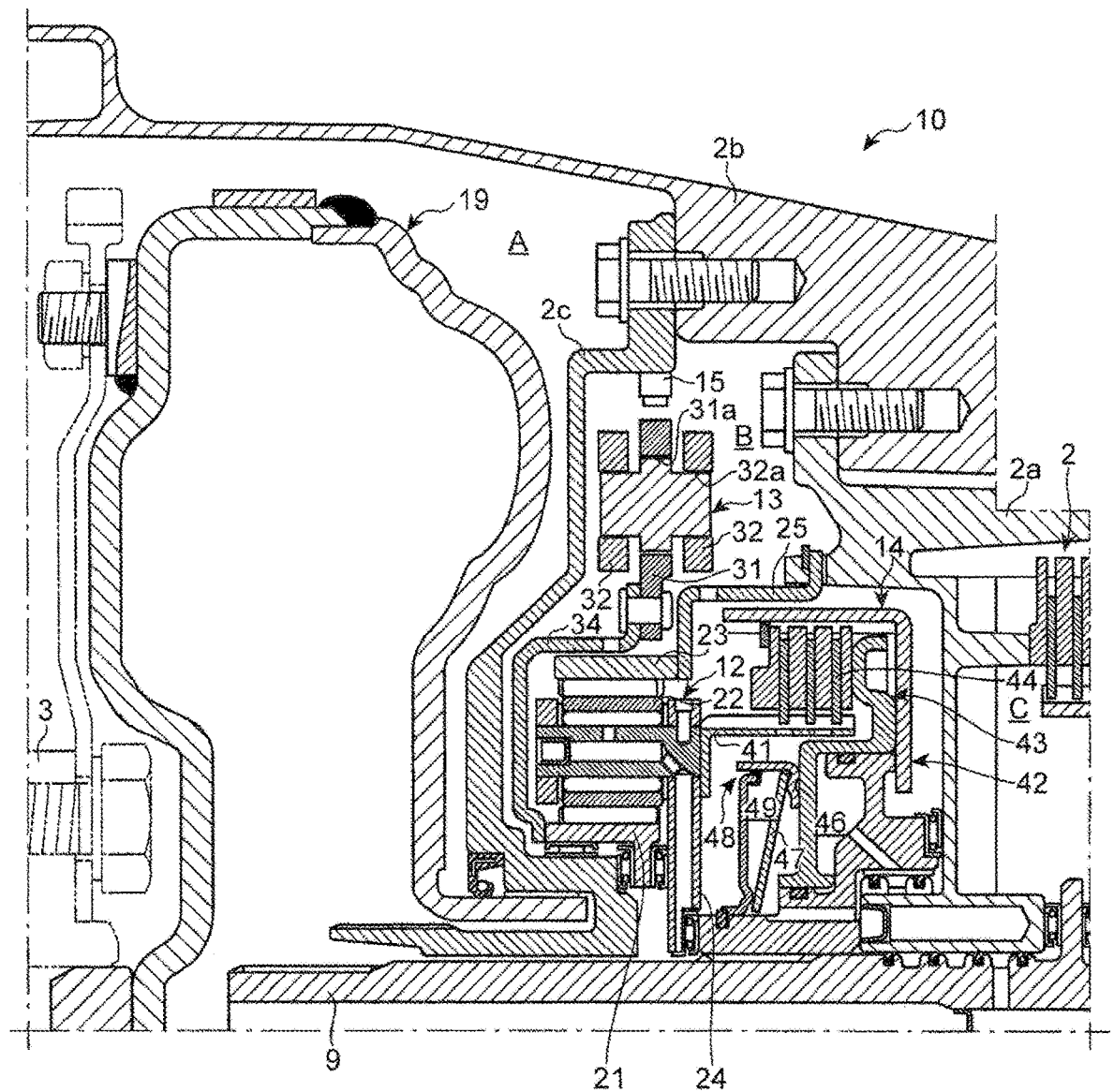
FIG. 22 is a longitudinal sectional view showing an advantageous embodiment of the power transmission apparatus with the centrifugal pendulum damper, the power transmission apparatus being connected to a torque converter.

The above embodiment has explained a case where the present invention is applied to an automatic transmission not including a torque converter. However, as shown in FIG. 22, the present invention may be applied to an automatic transmission including a torque converter.

INDUSTRIAL APPLICABILITY

As above, according to the present invention, the torque fluctuation and the vibration noise of the vehicle can be effectively suppressed while avoiding the size increase of the centrifugal pendulum damper and the deterioration of the reliability of the centrifugal pendulum damper by the high-speed rotation. Therefore, there is a possibility that the present invention is suitably utilized in the technical field of manufacture of this type of power transmission apparatus with the centrifugal pendulum damper or the vehicle including the power transmission apparatus with the centrifugal pendulum damper.

REFERENCE SIGNS LIST

2*a* first casing member (casing member)
9 input shaft (power transmitting shaft)
10, 110, 120, 130, 140, 150, 160, 170, 180, 190, 200, 210, 220, 230, 240 power transmission apparatus
12, 17 planetary gear set (speed-increasing mechanism)
13 centrifugal pendulum damper
14 clutch mechanism (engagement/disengagement mechanism)
14A first clutch mechanism (first engagement/disengagement mechanism)
14B second clutch mechanism (second engagement/disengagement mechanism)
16 brake mechanism (engagement/disengagement mechanism)
21 sun gear
23 ring gear
24 carrier
a first power transmission path
b second power transmission path

The invention claimed is:

1. A power transmission apparatus with a centrifugal pendulum damper,
    the power transmission apparatus being configured such that a centrifugal pendulum damper is coupled through a clutch mechanism and a planetary gear set to an input shaft of a transmission mechanism to which an output of an engine is input, wherein:
    the clutch mechanism, the planetary gear set, and the centrifugal pendulum damper are accommodated in a first casing member and a second casing member coupled to the first casing member, the first casing member accommodating the transmission mechanism;
    the clutch mechanism includes a clutch drum, a clutch hub, and a friction plate;
    the clutch drum is coupled to the input shaft of the transmission mechanism;
    the planetary gear set includes a sun gear, a carrier, and a ring gear;
    the sun gear is coupled to the centrifugal pendulum damper;
    the carrier is coupled to the clutch hub;
    the ring gear is fixed to the first casing member and the second casing member;
    the centrifugal pendulum damper includes a coupling member and a pendulum, the coupling member being coupled to the sun gear, the pendulum being supported so as to be displaceable relative to the coupling member;
    the pendulum is arranged at an outer periphery side of the planetary gear set and is located at a position overlapping the planetary gear set in an axial direction of the input shaft (9) of the transmission mechanism; and
    the clutch mechanism is arranged at an inner periphery side of the pendulum and is located at a position overlapping the planetary gear set when viewed from the axial direction of the input shaft of the transmission mechanism.

2. The power transmission apparatus according to claim 1, wherein:
    an internal space of the second casing member is divided by a cover member into a space close to the engine and a space close to the transmission mechanism;
    the space close to the engine accommodates a torsional damper mechanism configured to receive the output of the engine and transmit the output to the input shaft of the transmission mechanism; and
    the space close to the transmission mechanism accommodates the clutch mechanism, the planetary gear set, and the centrifugal pendulum damper.

* * * * *